(12) United States Patent
Le Goff et al.

(10) Patent No.: US 11,313,702 B2
(45) Date of Patent: Apr. 26, 2022

(54) SYSTEM AND METHOD FOR MONITORING ANALOG FRONT-END (AFE) CIRCUITRY OF AN INDUCTIVE POSITION SENSOR

(71) Applicant: Microchip Technology Inc., Chandler, AZ (US)

(72) Inventors: Stephane Le Goff, Plouzane (FR); Mathieu Sureau, San Francisco, CA (US); Jebas Paul Daniel T, Tirunelveli (IN); Naveen Cannankurichi, Hyderbad (IN); Subhasis Sasmal, Howrah (IN); Sunny Joel, Hyderbad (IN)

(73) Assignee: Microchip Technology Inc., Chandler, AZ (US)

( * ) Notice: Subject to any disclaimer, the term of this patent is extended or adjusted under 35 U.S.C. 154(b) by 13 days.

(21) Appl. No.: 17/075,157

(22) Filed: Oct. 20, 2020

(65) Prior Publication Data
US 2022/0034684 A1   Feb. 3, 2022

Related U.S. Application Data

(60) Provisional application No. 63/058,720, filed on Jul. 30, 2020.

(51) Int. Cl.
| | | |
|---|---|---|
| G01D 5/24 | (2006.01) | |
| G01D 5/244 | (2006.01) | |
| G01D 5/20 | (2006.01) | |
| G01B 7/00 | (2006.01) | |

(52) U.S. Cl.
CPC ......... G01D 5/24466 (2013.01); G01B 7/003 (2013.01); G01D 5/2073 (2013.01); G01D 5/24461 (2013.01)

(58) Field of Classification Search
CPC ............ G01D 5/24466; G01D 5/2073; G01D 5/24461; G01B 7/003
See application file for complete search history.

(56) References Cited

U.S. PATENT DOCUMENTS

| | | |
|---|---|---|
| 6,591,217 B1 | 7/2003 | Baur et al. |
| 8,482,894 B2 | 7/2013 | Yra et al. |
| 9,929,651 B2 | 3/2018 | Cannankurichi et al. |
| 10,761,549 B2 | 9/2020 | Sasmal et al. |
| 10,884,037 B2 * | 1/2021 | Chellamuthu ....... G01D 5/2073 |
| 2004/0065533 A1 | 4/2004 | Schwesig et al. |
| 2008/0176530 A1 | 7/2008 | Kuhn et al. |
| 2012/0242304 A1 | 9/2012 | Yra et al. |
| 2017/0141685 A1 | 5/2017 | Cannankurichi et al. |
| 2018/0196453 A1 | 7/2018 | Sasmal et al. |

OTHER PUBLICATIONS

PCT/US21/12006, International Search Report and Written Opinion, dated Apr. 7, 2021.

* cited by examiner

*Primary Examiner* — Jermele M Hollington
*Assistant Examiner* — Suresh K Rajaputra
(74) *Attorney, Agent, or Firm* — Glass and Associates; Kenneth Glass; Molly Sauter

(57) ABSTRACT

A system and method for monitoring analog front-end (AFE) circuitry of an inductive position sensor. A redundant AFE channel is provided and alternatively utilized with a sine AFE channel or a cosine AFE channel of the AFE circuitry to obtain a voltage difference that may result in a detection angle error at the electronic control unit (ECU) of the inductive position sensor.

21 Claims, 11 Drawing Sheets

SELECTING AN ANGULAR ERROR THRESHOLD (OPT. >3 DEGREES) FOR GENERATING A FAULT CONDITION AT THE ECU (OPT. BASED ON ASIL RATING) WHEREIN THE FAULT CONDITION MAY BE ATTRIBUTED TO ONE OR MORE ERROR SOURCES (OPT. INCLUDING BUT NOT LIMITED TO OFFSET ERRORS, COMMON MODE ERRORS, GAIN ERRORS, SINE OR COSINE AFE CHANNEL SHORT TO GROUND ERRORS, SINE OR COSINE AFE CHANNEL SHORT TO SUPPLY ERRORS, SINE OR COSINE AFE CHANNEL OUTPUT STUCK AT RANDOM VOLTAGE ERRORS, GAIN VARIATION ERRORS, ERRORS RESULTING FROM A DELAY BETWEEN THE SINE AND COSINE AFE CHANNELS AND ERRORS RESULTING FROM GENERATED HARMONICS)
700

↓

DETERMINING A PREDETERMINED THRESHOLD VOLTAGE AS A VOLTAGE DIFFERENCE BETWEEN THE OUTPUT VOLTAGE OF THE SINE AFE CHANNEL BUFFER OR THE COSINE AFE CHANNEL BUFFER AND THE OUTPUT VOLTAGE OF THE REDUNDANT AFE CHANNEL BUFFER THAT WOULD EQUATE TO THE PREDETERMINED ANGULAR ERROR THRESHOLD AT THE ECU
710

FIG. 8

SYSTEM AND METHOD FOR MONITORING ANALOG FRONT-END (AFE) CIRCUITRY OF AN INDUCTIVE POSITION SENSOR

CROSS-REFERENCE TO RELATED APPLICATIONS

The present application claims priority to U.S. Provisional Patent Application Ser. No. 63/058,720 filed on Jul. 30, 2020, the contents of which are incorporated by reference herein in their entirety.

TECHNICAL FIELD OF THE INVENTION

Embodiments of the present invention are related to inductive position sensors and, in particular, to a method for ensuring the safety of a system employing the inductive position system by monitoring the angular deviation resulting from inaccuracies present in the analog front-end (AFE) circuitry of the system that resolves the angular position.

BACKGROUND OF THE INVENTION

Inductive position sensors are known in the art for use in automotive, industrial and consumer applications for sensing linear and rotary position of metallic targets. In common inductive position sensors, a resonating transmitter coil magnetically induces a current in the receiver coils which results in fixed voltage oscillations unless disturbed by any metallic target movement. Altering the position of the metallic target results in changes in the induced current. The receiver coils of the inductive position sensor are used to detect the changes in the induced currents and a processor utilizes the signals from the receiver coils to determine the relative position of the metallic target. The transmitter coil, the receiver coils and the processor are normally formed on a printed circuit board (PCB).

Inductive position sensors must often comply with safety standards. For example, International Standards Organization (ISO) 26262 establishes a standard for functional safety management for automotive applications and defines safety standards for the development and production of individual automotive products. In particular, the Automotive Safety Integrity Level (ASIL) defined by ISO 26262 provides a classification of inherent safety risk in an automotive system or elements that expresses the level of risk reduction required to prevent a specific hazard, with ASIL D representing the highest integrity requirements and ASIL A the lowest. In order to meet these standards, particularly ASIL levels C and D, a high level of self-diagnostic capability of the inductive sensor is required to detect inherent errors.

One known technique for meeting the integrity requirements of the above mentioned ASIL standards is the use of redundancy, wherein two or more independent inductive sensors are used to measure the same parameter, such as the angular or linear position of the metallic target, and an Electronic Control Unit (ECU) of the automobile compares the multiple redundant sensor outputs to identify any deviation resulting from the analog signal processing channel of the inductive sensors, which may equate to a fault in the system. However, incorporating redundant sensors is undesirable because it increases the overall cost of the system and requires additional area and interface connections at the board level. Incorporating redundant sensors is also undesirable because it may increase the design complexity of the system. For example, when using redundant sensors, a common requirement is that any fault condition present in one of the inductive sensors should not result in a fault in any of the other inductive sensors. Designing the system to meet this requirement adds additional complexity, which is undesirable.

Accordingly, what is needed in the art is an improved system and method for continuously detecting the inherent integrated circuit (IC) errors which result in angle measurement errors at the position sensor, thus reducing the risk to conform with safety rating standards.

SUMMARY OF THE INVENTION

In various embodiment, the present invention provides a system and method for detecting angle measurement errors resulting from the analog circuitry of an inductive position sensor.

In one embodiment, the method of the present invention includes a method for monitoring analog front-end (AFE) circuitry of an inductive position sensor. The method includes, establishing a redundant analog front-end (AFE) channel having an output coupled to a redundant AFE channel buffer in AFE circuitry of an inductive position sensor, the AFE circuitry further comprising a sine signal AFE channel, a cosine signal AFE channel, a sine AFE channel buffer coupled to an output of the sine signal AFE channel and a cosine AFE channel buffer coupled to an output of the cosine signal AFE channel. The method further includes, alternately selecting a sine output signal or a cosine output signal from a receiver coil of the inductive position sensor, processing the sine output signal through the redundant AFE channel and the redundant AFE channel buffer when the sine output signal is selected or processing the cosine output signal through the redundant AFE channel and the redundant AFE channel buffer when the cosine output signal is selected. When the sine output signal is selected, the method additionally includes, comparing an output voltage of the sine AFE channel buffer with an output voltage of the redundant AFE channel buffer to determine a voltage difference between the output voltage of the sine AFE channel buffer and the output voltage of the redundant AFE channel buffer and when the cosine output signal is selected, the method additionally includes, comparing an output voltage of the cosine AFE channel buffer with the output voltage of the redundant AFE channel buffer to determine the voltage difference between the output voltage of the cosine AFE channel buffer and the output voltage of the redundant AFE channel buffer. The method then proceeds by determining if the voltage difference is greater than a predetermined threshold voltage which corresponds to a given angular error.

If it is determined that the voltage difference is greater than the predetermined threshold voltage, then the method proceeds by signaling a fault condition to an electronic control unit (ECU) coupled to the inductive position sensor. In particular, the voltage difference determined by the method of the present invention equates to an angle error at the ECU and the predetermined threshold voltage equates to a predetermined angular error threshold at the ECU. In a particular embodiment, digital filtering of the voltage difference may be performed prior to signaling a fault condition. Additionally, the predetermined angular error threshold is adjustable and may be based upon an Automotive Safety Integrity Level (ASIL) rating.

In another embodiment, the present invention provides a system for monitoring analog front-end (AFE) circuitry of an inductive position sensor. The system includes, a redundant AFE channel having an output coupled to a redundant AFE channel buffer and a processor coupled to a sine signal AFE channel, a cosine signal AFE channel, a sine AFE channel buffer coupled to an output of the sine signal AFE channel, a cosine AFE channel buffer coupled to an output of the cosine signal AFE channel and the redundant AFE channel. The processor is configured to alternately select a sine output signal or a cosine output signal from a receiver coil of an inductive position sensor to process the sine output signal through the redundant AFE channel and the redundant AFE channel buffer when the sine output signal is selected or instruct the redundant AFE channel to process the cosine output signal through the redundant AFE channel and the redundant AFE channel buffer when the cosine output signal is selected. The system further includes a comparator circuit coupled to an output of the sine AFE channel buffer, an output of the cosine AFE channel buffer, an output of the redundant AFE channel buffer and the processor. The comparator circuit is configured to, obtain a voltage difference as the difference between a voltage at the output of the sine AFE channel buffer and a voltage at the output of the redundant AFE channel buffer when the sine output signal is selected, obtain the voltage difference as the difference between a voltage at the output of the cosine AFE channel buffer and a voltage at the output of the redundant AFE channel buffer when the cosine output signal is selected. The system is configured to determine if the voltage difference obtained by the comparator circuit is greater than a predetermined threshold voltage and signal a fault condition to an electronic control unit (ECU) coupled to the inductive position sensor if it is determined that the voltage difference is greater than the predetermined threshold voltage.

Sine and cosine signals are generated when the target is continuously moving. However, in an additional embodiment, the present invention can be utilized for a non-moving target, wherein a DC voltage is present on the sine and cosine channels In other words, the present invention works well with a system where the target is moving discretely, without any certain frequency, or continuously with a certain frequency.

Accordingly, in various embodiments, the present invention provides an improved system and method for detecting and reducing inductive position sensor errors to conform with safety rating standards.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 8 is a flow diagram illustrating steps for determining a predetermined threshold voltage for an error source which equates to a predetermined angular error at the ECU, in accordance with an embodiment of the present invention.

DETAILED DESCRIPTION OF THE INVENTION

Figure 1:
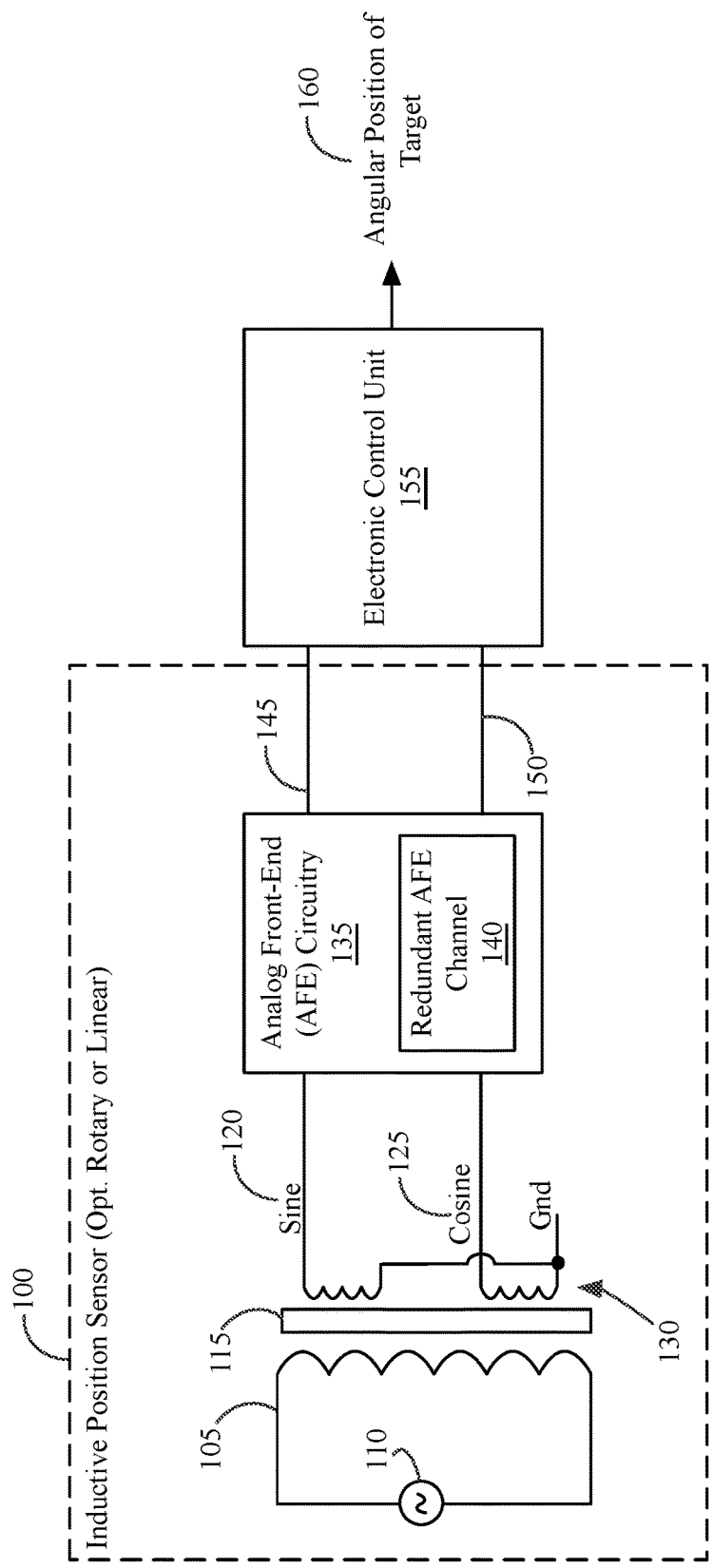
FIG. 1 is a block diagram illustrating an inductive position sensor system, in accordance with an embodiment of the present invention.

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications, and equivalents, which may be included within the spirit and scope of the various embodiments as defined by the appended claims. Furthermore, in this Detailed Description of the Invention, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

It will be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to conform with ASIL ratings, an inductive position sensor needs to be able to self-diagnose for analog signal processing errors that may result in computational angle errors at the ECU, which may be considered a fault condition. In the case of single point failures, where the entire system may be compromised, it is critical that these errors be detected and communicated to the ECU.

In various embodiments, the present invention provides an improved system and method for monitoring the analog front-end (AFE) circuitry of an inductive position sensor to identify errors that may result in a critical fault condition. The inductive position sensor may be a rotary sensor or a linear sensor, wherein angular or linear mechanical displacement is converted to electrical signals based upon the angular displacement of the sensor receiver coils.

As is illustrated with reference to FIG. 1, an inductive position sensor 100 may include a transmitter coil 105 and receiver coils 130. In operation of the inductive position sensor 100, an oscillator 110 drives the transmitter coil 105 to generate a time-varying magnetic field which induces eddy currents in the conductive target 115 that is positioned between the transmitter coil 105 and the receiver coils 130. The receiver coils 130 respond to changes in the linear or rotational position of the conductive target 115. As is known in positional sensors, the raw sensor data from the inductive position sensor 100 includes sine signals 120 and cosine signals 125. These signals 120, 125 are provided as input to analog front-end circuitry 135. The analog front-end (AFE) circuitry 135 demodulates, amplifies and filters the sine 120 and cosine 125 signals. The outputs of the AFE circuitry 135 are analog differential outputs at pin OUT2P/N 145 and at pin OUT1P/N 150 that are sent to the electronic control unit (ECU) 155. These analog differential outputs are monitored by the ECU 155 and the angular position of the target 115 is calculated using the arctangent of the ratio of the sine signal 120 and cosine signal 125, as is commonly known in the art. The calculated angular position 160 of the target 115 is then available at the output of the ECU 155.

Characteristics of the AFE circuitry 135, such as gain and offset, are typically calibrated during the fabrication process of the integrated circuit. However, when the inductive position sensor 100 is subsequently placed in the field, previously unidentified defects in the integrated circuit may cause the circuitry to prematurely age, resulting in a slowly drifting offset, gain or phase delay in the AFE sine or cosine channel. The error resulting from these drifting parameters may introduce errors into the system. In some further detail, in operation of the AFE circuitry 135, the sine signal 120 is processed through a sine signal AFE channel and the cosine signal 125 is processed through a cosine signal AFE channel that is different than the sine signal AFE channel. As such, the different signal channels of the raw sensor data represented by the sine and cosine signals 120, 125 may introduce errors into the data. These errors may include offset errors, gain errors and phase errors.

An offset error may occur when one or both of the sine signal 120 and the cosine signal 125 are differentially shifted in the voltage domain. Gain errors may occur when there are different gains in the sine signal AFE channel and the cosine signal AFE channel that result in different amplitudes. Phase errors in the data may result when the phase shift resulting from the AFE sine channel and the AFE cosine channel are not equal to 90°. In general, both DC (static) and AC (dynamic) error may be introduced by the AFE circuitry 135 into the AFE sine channel and the AFE cosine channel. Additional errors may include common mode errors, sine or cosine AFE channel outputs short to ground errors, sine or cosine AFE channel outputs short to supply errors, sine or cosine AFE channel output stuck at random voltage errors or mutual shorts, gain variation errors, errors resulting from a difference in delay between the sine and cosine AFE channels and errors resulting from generated harmonics.

Err
ors introduced by the AFE circuitry 135 result in a voltage difference on pin OUT2P/N 145 and/or pin OUT1P/N 150, when compared with what would be an expected voltage on pin OUT2P/N 145 and/or pin OUT1P/N 150 without errors, thereby resulting in an angle measurement error at the ECU 155. The present invention provides an efficient mechanism for monitoring the AFE circuitry 135 for errors by introducing a redundant AFE channel 140 into the AFE circuitry 135 of the inductive position sensor 100.

Figure 2:
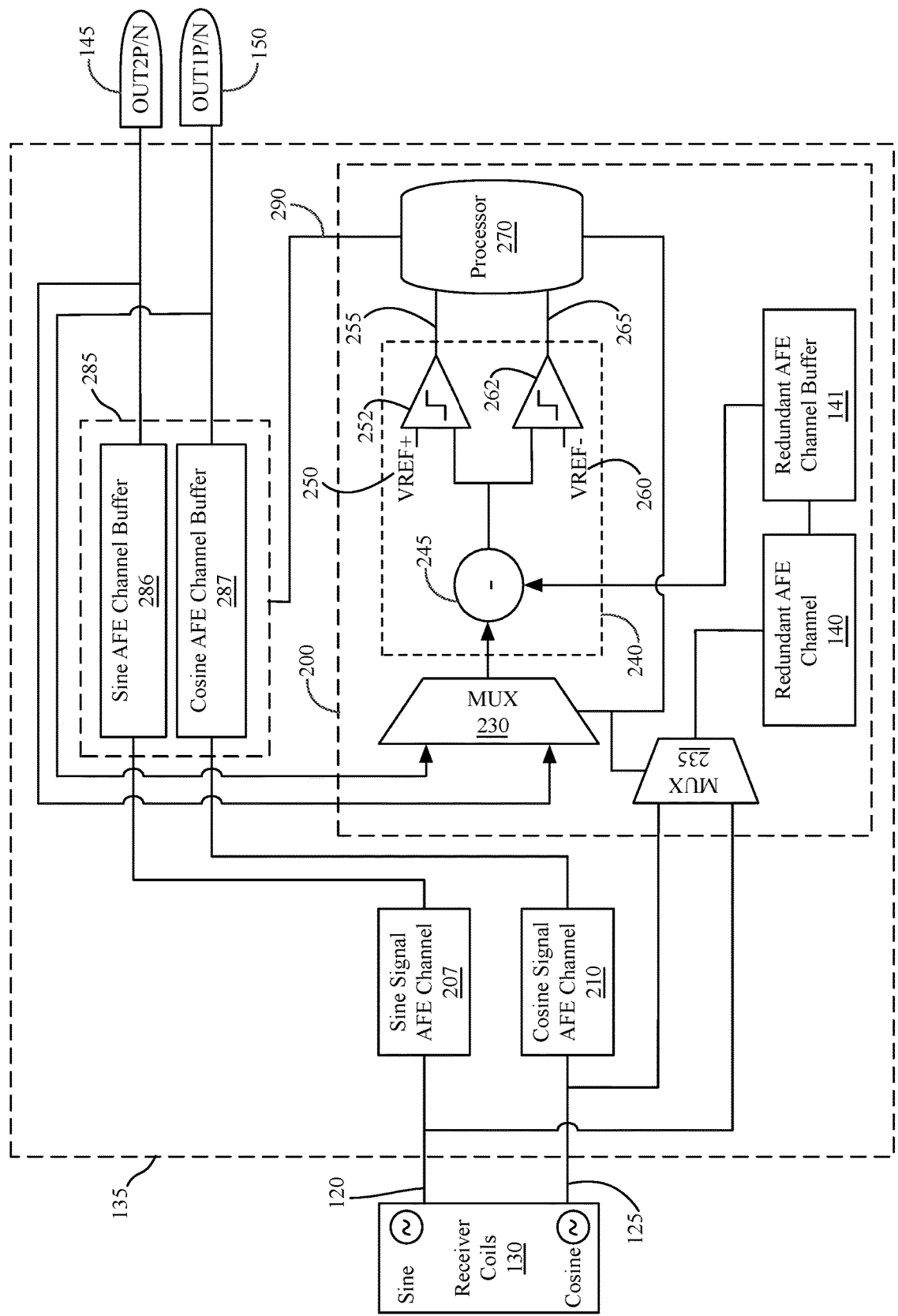
FIG. 2 is a block diagram illustrating a system for monitoring AFE circuitry of an inductive position sensor, in accordance with an embodiment of the present invention.

Referr
ing to FIG. 2, a predetermined threshold voltage includes a predetermined positive threshold voltage 250 and a predetermined negative threshold voltage 260 which have a deterministic relationship with an angle error calculated by the ECU 155 of FIG. 1. The position of the target 115 is calculated by the ECU 155 by dividing the magnitude of the sine signal 120 by the magnitude of the cosine signal 125 and then taking the arctangent. The voltage difference between the sine signal AFE channel, or the cosine signal AFE channel, and the redundant AFE channel 140 is calculated and the voltage difference is compared to the predetermined positive threshold voltage 250 and to the predetermined negative threshold voltage 260. The predetermined threshold voltage equates to an expected angle error tolerance at the ECU 155. A table illustrating the relationship between the voltage difference for a given parameter and a resulting angular error tolerance of 3° at the ECU 155, assuming a peak amplitude voltage of 1V, is shown below. While the table illustrates an exemplary embodiment wherein the angular error tolerance is 3°, it is understood that the allowable voltage deviation scales linearly for other angular error values. The predetermined positive threshold voltage 250 and the predetermined negative threshold voltage 260 are selected based upon the allowable angular error converted to voltage deviation values as provided in the table. As such, whenever the voltage difference between the sine signal AFE channel, or the cosine signal AFE channel, and the redundant AFE channel 140 exceeds the predetermined threshold voltage, a fault signal is generated and sent to a processor 270, as will be described further below. The table relates the parameter responsible for the error and the corresponding allowable deviation and is used to set the values for the predetermined positive threshold voltage 250 and the predetermined negative threshold voltage 260 for a deviation of 3° angular error at the ECU 155. It is noted that the predetermined threshold voltages are determined assuming a single parameter is responsible for the error at a time. As such, whenever one of the parameters is a source of the error identified by the AFE circuitry 135 which results in a voltage difference between the sine signal AFE channel, or the cosine signal AFE channel, and the redundant AFE channel 140 that exceeds either of the predetermined threshold voltages 250, 260 the fault signal is generated and sent to the processor 270.

| Parameters | Allowable Deviation for 3° Angular Error |
|---|---|
| Offset (V) | +/−0.052 |
| Gain Error (%) | +/−11 |
| Delay (Frequency = 1 KHz) (μs) | +/−8.5 |
| Delay (Frequency = 10 KHz) (μs) | +/−0.85 |
| Harmonics (V) | +/−0.0525 |
| Common Mode difference*(V) | 0.0525 |

While the predetermined threshold voltages are described as being determined assuming that a single parameter is responsible for the error, it is also possible that several parameters may simultaneously contribute to the error.

With reference to FIG. 1 and FIG. 2, the present invention provides a system 200 for monitoring the AFE circuitry 135 of an inductive position sensor 100. The system 200 includes the redundant AFE channel 140, a redundant AFE channel buffer 141 coupled to an output of the redundant AFE channel 140, a processor 270, a first multiplexer 235, a second multiplexer 230 and a comparator circuit 240.

In operation, the processor 270 is configured to alternately select a sine output signal 120 or a cosine output signal 125 from a receiver coil 130 of an inductive position sensor 100 to be fed to the redundant AFE channel 140 and the redundant AFE channel buffer 141. In particular, the processor 270 controls the first multiplexer 235 to select either the sine output signal 120 or the cosine output signal 125 to be processed through the redundant AFE channel 140 and the redundant AFE channel buffer 141. In particular, a control signal from the processor 270 is provided to the first multiplexer 235 to select either the sine signal 120 or the cosine signal 125 from the receiver coils 130 to be processed through the redundant AFE channel 140 and the redundant AFE channel buffer 141. The sine AFE channel buffer 286, the cosine AFE channel buffer 287 and the redundant AFE channel buffer 141 are designed to have similar characteristics (bandwidth, propagation delay) over a given range of load conditions, that are commonly seen in inductive sensor applications, irrespective of the differing load conditions, and within the limits of the angular error threshold. By matching the characteristics of the sine AFE channel buffer 286, the cosine AFE channel buffer 287 and the redundant AFE channel buffer 141, the present invention ensures that variations in the capacitive and resistive loading at the output pin 145 of sine AFE channel buffer 286 and the output pin 150 of the cosine AFE channel buffer 287 do not affect the functionality of the angular error determination.

Additionally, the functionality of the invention is maintained regardless of the loading present on the input pins providing the sine signal 120 and the cosine signal 125. The inputs to the redundant AFE channel 140 are connected directly to the input pins providing the sine signal 120 and the cosine signal 125, thereby ensuring that the redundancy begins at the input pins. Therefore, any changes at the input pins become common for both the sine signal AFE channel 207, the cosine signal AFE channel 210 and the redundant AFE channel 140. As such, the angle error diagnostic functionality remains unaffected by any loading at the input pins which receive the sine signal 120 and cosine signal 125 from the receiver coils 130.

In a particular embodiment, a double wire bond may be provided at the input pins for the sine signal 120 and the cosine signal 125. The double wire bond provides protection against a bonding wire failure, wherein if one of the bonding wires fails, the second bonding wire will continue to supply the signals 120, 125 to the AFE circuitry 135.

Additionally, the AFE circuitry 135 may include electrostatic discharge (ESD) circuitry, such as an electromagnetic charge (EMC) filter, at the input pins providing the sine signal 210 and the cosine signal 125. Since the inputs to the redundant AFE channel 140, as selected by a first multiplexer 235, are provided by the input pins for the sine signal 120 and the cosine signal 125, ESD protection will also be provided to the redundant AFE channel 140 through these input pins. Alternatively, it is possible to duplicate the inputs pins 120 and 125 of the system 200 to provide the sine signal 120 and the cosine signal 125 to the first multiplexer 235, thereby providing redundancy at the input pins. In this case, bond wires and dedicated electrostatic discharge (ESD) circuitry can be coupled to these duplicate input pins for monitoring the AFE circuitry 135 of the inductive position sensor 100.

In the system 200 a comparator circuit 240 is coupled to an output of the second multiplexer 230. The output of the sine signal AFE channel 207 and the cosine signal AFE channel 210 are provided to a buffer 285. The buffer 285 includes a sine AFE channel buffer 286 and a cosine AFE channel buffer 287, wherein the output of the sine signal AFE channel 207 is coupled to the sine AFE channel buffer 286 and the output of the cosine signal AFE channel 210 is coupled to the cosine AFE channel buffer 287. An output of either the sine AFE channel buffer 286 or the cosine AFE channel buffer 287 is selected by a second multiplexer 230, responsive to a control signal from the processor 270, to be alternately monitored by the comparator circuit 240.

In operation, when the sine signal 120 is selected, the sine signal 120 is passed by the first multiplexer 235 to be processed through the redundant AFE channel 140 and the redundant AFE channel buffer 141. Simultaneously, the processor 270 selects the output of the sine AFE channel buffer 286 to be passed by the second multiplexer 230 to be provided to the comparator circuit 240, particularly to the respective inputs of subtractor circuit 245. The output from the sine AFE channel buffer 286 and the output from the redundant AFE channel buffer 141 are thus provided as respective inputs to the comparator circuit 240. The comparator circuit 240 includes subtractor circuit 245, a positive threshold voltage comparator 252 and a negative threshold voltage comparator 262. The subtractor circuit 245 determines a voltage difference between the output of the sine AFE channel buffer 286 and the output of the redundant AFE channel buffer 141. The voltage difference determined by the subtractor circuit 245 is then compared to both the predetermined positive threshold voltage 250 at the positive threshold voltage comparator 252 and to the predetermined negative threshold voltage 260 at the negative threshold voltage comparator 262 to determine if the voltage difference exceeds either the predetermined positive threshold voltage 250 or the predetermined negative threshold voltage 260. An error pulse, representative of a digital error logic signal, is generated by the comparator circuit 240 if the voltage difference exceeds either the predetermined positive threshold voltage 250, thereby toggling the output of positive threshold voltage comparator 252, or the predetermined negative threshold voltage 260, thereby toggling the output of negative threshold voltage comparator 262. The error pulse generated by the comparator circuit 240 has a corresponding duration which is dependent upon the nature and quantity of voltage difference. The error pulse generated by the comparator 240 can be either continuously HIGH or may toggle between HIGH and LOW with a finite HIGH period, depending upon the nature and quantity of the voltage difference. If the predetermined positive threshold voltage 250 is exceeded, the positive threshold voltage comparator 252 provides the resulting error pulse as an input 255 to the processor 270. Alternatively, if the predetermined negative threshold voltage threshold 260 is exceeded, the negative threshold voltage comparator 262 provides the resulting error pulse as an input 265 to the processor 270.

Alternatively, when the cosine signal 125 is selected, the cosine signal 125 is passed by the first multiplexer 235 to be processed through the redundant AFE channel 140 and the redundant AFE channel buffer 141. Simultaneously, the processor 270 selects the output of the cosine AFE channel buffer 287 to be passed by the second multiplexer 230 to be provided to comparator circuit 240. The output from the cosine AFE channel buffer 287 and the output from the redundant AFE channel buffer 141 are thus provided as respective inputs to the comparator circuit 240, particularly to the respective inputs of subtractor circuit 245. The voltage difference determined by the subtractor circuit 245 of the comparator circuit 240 is then compared to both the predetermined positive threshold voltage 250 at the positive threshold voltage comparator 252 and to the predetermined negative threshold voltage 260 at the negative threshold voltage comparator 262 to determine if the voltage difference exceeds either the predetermined positive threshold voltage 250 or is more negative than the predetermined negative threshold voltage 260. An error pulse, representative of a digital error logic signal and having a pulse duration, is generated by the comparator 240 based upon the result of the comparison. If the predetermined positive threshold voltage 250 is exceeded, the positive threshold voltage comparator 252 provides the resulting error pulse as an input 255 to the processor 270. Alternatively, if the predetermined negative threshold voltage threshold 260 is exceeded, the negative threshold voltage comparator 262 provides the resulting error pulse as an input 265 to the processor 270.

If the comparator 240 determines that a voltage difference between either the output of sine AFE channel buffer 286, or the output of cosine AFE channel buffer 287, and the output of the redundant AFE channel buffer 141 exceeds the predetermined threshold voltage, then the processor 270 signals a fault condition to an electronic control unit (ECU) coupled to the inductive position sensor through output pins OUT1P/N 150 and OUT2P/N 145. The sine AFE channel buffer 286 and the cosine AFE channel buffer 287 of the buffer 285 are controlled by a fault signal 290 from the processor 270. In operation, if the voltage difference detected by the comparator circuit 240 exceeds a threshold voltage, i.e. either the predetermined positive threshold voltage 250 or the predetermined negative threshold voltage 260, the processor 270 asserts the fault signal 290 to disable both the sine AFE channel buffer 286 or the cosine AFE channel buffer 287 of the buffer 285. Disabling the respective AFE channel buffer sets output pins OUT1P/N 150 and OUT2P/N 145 to a high impedance state. At the ECU, these output pins 145, 150 will be coupled to either pull-up or pull-down resistors. So, when these output pins 145, 150 are in a high impedance state, the pull-up or pull-down resistors will define the voltage levels of these output pins 145, 150, which will be either HIGH (pull-up) or LOW (pull-down). The ECU understands that the voltage level at these output pins 145, 150 as fault conditions because the normal operating range may be set between about 5% above ground level and about 5% below supply level. For example, with a supply voltage of 5V, the operating range is between about 0.25V and 4.75V. So, any voltage level below 0.25V or above 4.75V will be inferred as a fault condition by the ECU. The voltage levels described are exemplary, and other voltage levels are within the scope of the present invention. The above is provided as a non-limiting example of signaling the fault condition to the ECU 155, it being understood that other signaling may be provided from system 200 to the ECU 155 without exceeding the scope.

In response to an error condition in the sine signal AFE channel 207 or the cosine signal AFE channel 210, the processor 270 places the output pins 145, 150 in a high impedance state by placing the sine AFE channel buffer 286 and the cosine AFE channel buffer 287 of the buffer 285 in a high impedance state by asserting fault signal 290. After placing the AFE channel buffers 286, 287 in a high impedance state in response to the error, the processor 270 reboots and the buffers 286, 287 are taken out of the high impedance state. Following the reboot, if the error condition persists, the processor 270 will continue placing the buffers 286, 287 in a high impedance state and rebooting as long as the error condition remains. Alternatively, instead of rebooting processor 270, the fault signal 290 is asserted for a predetermined assertion period, and then de-asserted for a predetermined de-assertion period to allow the error condition loop to clear.

When either of the predetermined threshold voltages is exceeded, the voltage difference determined by the system 200 of the present invention equates to an angle error at the ECU 155. The predetermined angular error threshold may be adjustable, and in a specific application, the predetermined angular error threshold may be based upon an Automotive Safety Integrity Level (ASIL) rating. In an exemplary embodiment, the predetermined angular error threshold may be set to be greater than about 3°. As such, if a voltage difference determined by the system 200 equates to an angular error greater than about 3°, a fault condition will be detected by the inductive position sensor 100. Accordingly, the redundant AFE channel 140 of the system 200 of the present invention is used to capture the errors that will result in a fault condition. Any single point failure (SPF) within the AFE circuitry 135 leading to a computed angle error above a predefined threshold at the ECU 155 is detected by the present invention.

Various means may be used to select the predetermined threshold voltage for the comparator 240 that will equate to the predetermined angular error threshold at the ECU 155. In general, relating the predetermined angular error threshold to the voltage difference from the comparator 240 will provide the predetermined threshold voltage for each of the possible error types, including but not limited to, offset errors, gain errors and phase errors. In various embodiments, the predetermined angular error threshold may be trimmable between about 3° and about 15°, as determined by the specific application. The trimmable range can be further reduced to cover even smaller angular error thresholds by using various techniques known in the art, such as auto-zeroing, or improved AFE calibration, without limitation. These various techniques may be important in reducing the residual errors in the redundant AFE channel as these errors place a limit on the allowable predetermined angular error threshold range, and more particularly on the lower side, to provide coverage for ranges below 3°.

In order to prevent voltage glitches from triggering false faults and to comply with the defined fault tolerant time interval (FTTI) at the ECU 155, the processor 270 is further configured to digitally process the error pulses received from comparator circuit 240 until the fault tolerant time interval (FTTI) has been met. The processor 270 may implement an algorithm for filtering out error pulses having a duration of less than a predetermined error pulse duration, thereby only asserting error signal 290 responsive to an error pulse of duration greater than the defined FTTI. The defined FTTI may be application and user specific based upon a tolerance for voltage glitches.

The processor 270 may be configured to perform various digital processing steps to adhere with different application safety standards and to avoid false error triggering. Glitches or other unwanted signals may be filtered-out by these digital processing steps. The processor 270 may also rely on the predetermined fault tolerant time interval (FTTI), a predetermined error pulse filter duration and a predetermined fault counter maximum value to prevent false error triggering, in compliance with the application safety standards. Each of the predetermined FTTI, the predetermined error pulse filter duration and the predetermined fault counter maximum value are trimmable in order to meet the requirements of different safety standards and to avoid false error triggering. FTTI specifies the minimum duration of an error pulse output by comparator circuit 240 before the output pins 145, 150 should be placed into the high impedance state. The predetermined error pulse filter duration ($T_{period\_tol}$) defines the duration of a valid error pulse, which error pulse has a duration ($T_{period}$), the error pulses generated by the comparator circuit 240. The processor 270 considers the error pulse from the comparator circuit 240 as valid only if the duration of the error pulse ($T_{period}$) is equal to or greater than the predetermined error pulse filter duration ($T_{period\_tol}$). Filtering the error pulses masks any narrow error pulses occurring as a result of glitches in the system. The function of the fault counter is to count the above-mentioned valid error pulses within each FTTI interval. The processor 270 uses the fault counter to validate the number of valid error pulses that need to occur before sending a fault condition to the ECU.

In various exemplary embodiments, the FTTI may be trimmable to 500 μs, 1 ms, 8 ms or 15 ms, the predetermined error pulse filter duration ($T_{period\_tol}$) may be trimmable to 10 μs, 20 μs, 40 μs or 80 μs and the predetermined fault counter maximum value may be trimmable between 0 and 7.

Figure 3:
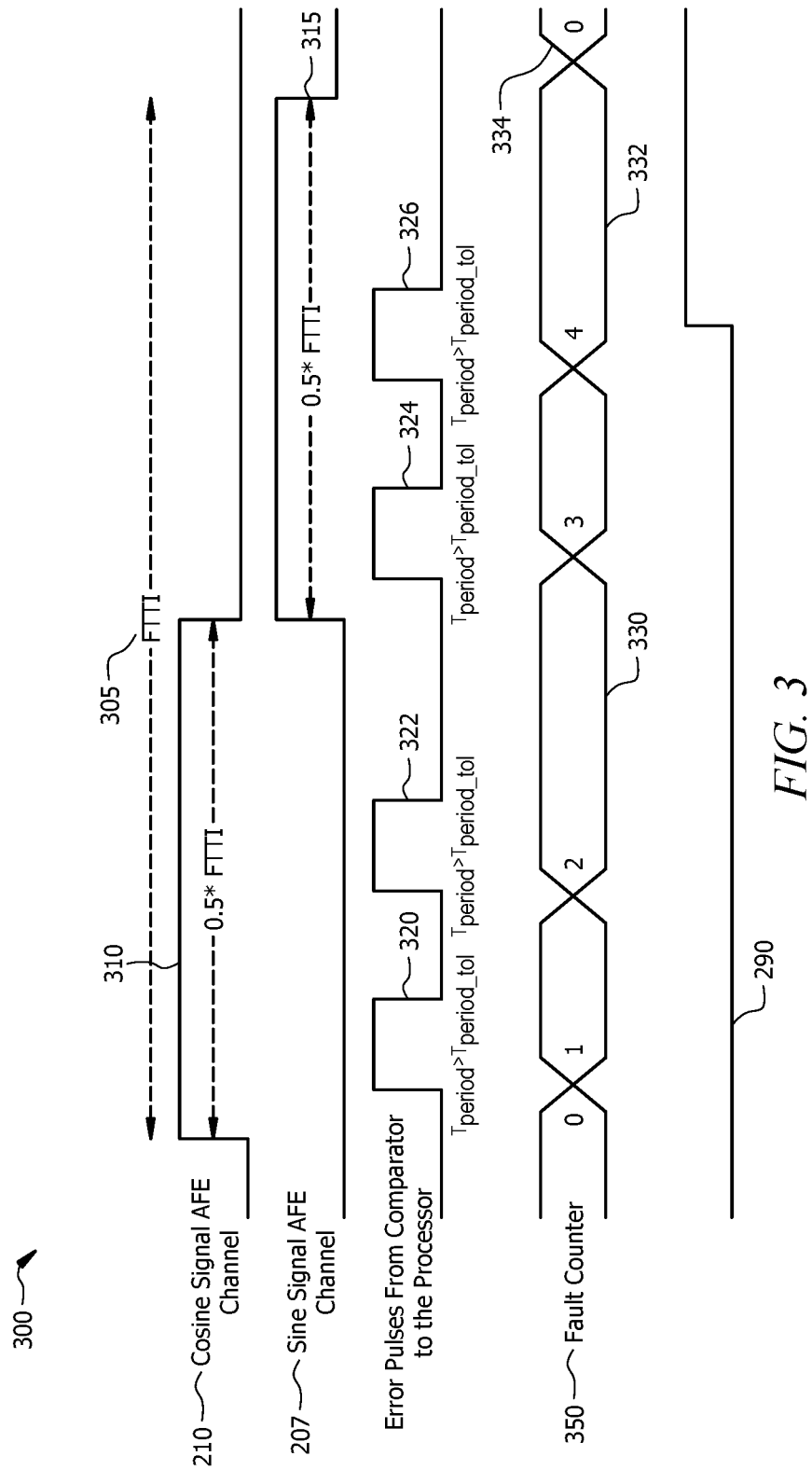
FIG. 3 is a timing diagram illustrating the signal processing of a cosine and sine signal for error detection in an inductive position sensor, in accordance with an embodiment of the present invention.

FIG. 3 illustrates a timing diagram 300 of exemplary steps performed by the processor 270 to avoid false triggering and thus false enabling of a high impedance condition. As shown in this embodiment, the cosine signal AFE channel 210 and the sine signal AFE channel 207 are each being monitored for ½ of a FTTI 305 (0.5*FTTI), wherein the cosine signal AFE channel 210 is monitored during a first ½ FTTI 310 and the sine signal AFE channel 207 is monitored during a second ½ FTTI 315. For instance, with an FTTI 305 of 500 μs, 250 μs are dedicated to monitoring the sine signal AFE channel 207 and 250 μs are dedicated to monitoring the cosine signal AFE channel 210. Since both of the channels are periodically monitored, any failure resulting in an angular error greater than the predetermined threshold and having a failure duration equal to or greater than the FTTI interval is captured. It is also possible to have the sine signal AFE channel monitoring period and the cosine signal AFE channel monitoring period less than ½ of a FTTI and have multiple monitoring cycles within a FTTI interval.

As shown, during the time that the cosine signal AFE channel 210 is selected, the comparator circuit 240 generates two error pulses 320, 322. In this embodiment, the duration of each of the error pulses ($T_{period}$) generated while the cosine signal AFE channel 210 is selected are greater than a predetermined error pulse filter period ($T_{period\_tol}$). As previously described, error pulses having a pulse duration greater than the predetermined error pulse filter period ($T_{period\_tol}$) are sufficient to increment a fault counter 350. As such, the two pulses 320, 322 generated by the comparator 240 and received at the processor 270 during the first ½ FTTI 310 both increment the fault counter 350, so the fault counter value is incremented to a value of "2" 330 by the end of the first ½ FTTI 310. Additionally, during the time that the sine signal AFE channel 207 is selected, the comparator 240 generates two additional error pulses 324, 326. Since the duration of the both pulses 324, 326 is greater than the predetermined error pulse filter period, the fault counter 350 incremented to a value of "4" by the end of the second ½ FTTI 305. Assuming that the predetermined fault counter maximum value is set to a value of 4, the fault signal 290 from the processor 270 will be asserted, e.g. set to a high value responsive to the fault counter 350 incrementing to the value of "4" 332, thereby setting the buffers 285 to a high impedance state and indicating a fault condition to the ECU. Additionally, the fault counter is reset to "0" 334 at the end of the FTTI interval 305 when the predetermined fault counter maximum value has not been reached at the end of the FTTI interval 305. Following a fault condition, the system will be in a reset state and the output pins 145, 150 will be at a high impedance value until a predetermined reset time is reached. Once the predetermined reset time is reached, the system 200 will release the high impedance state and resume to a normal mode of operation. If the error persists, then the system 200 will again set the output pins 145, 150 to a high impedance value and enter into a reset state. As such, in this embodiment, the processor 270 receives 4 valid error pulses from the comparator 240 within a single FTTI 305. Assuming that the fault counter maximum value is set to "4", the error pulses 320, 322, 324, 326 received during the FTTI 305 are effective in triggering a fault condition at the ECU.

Figure 4:
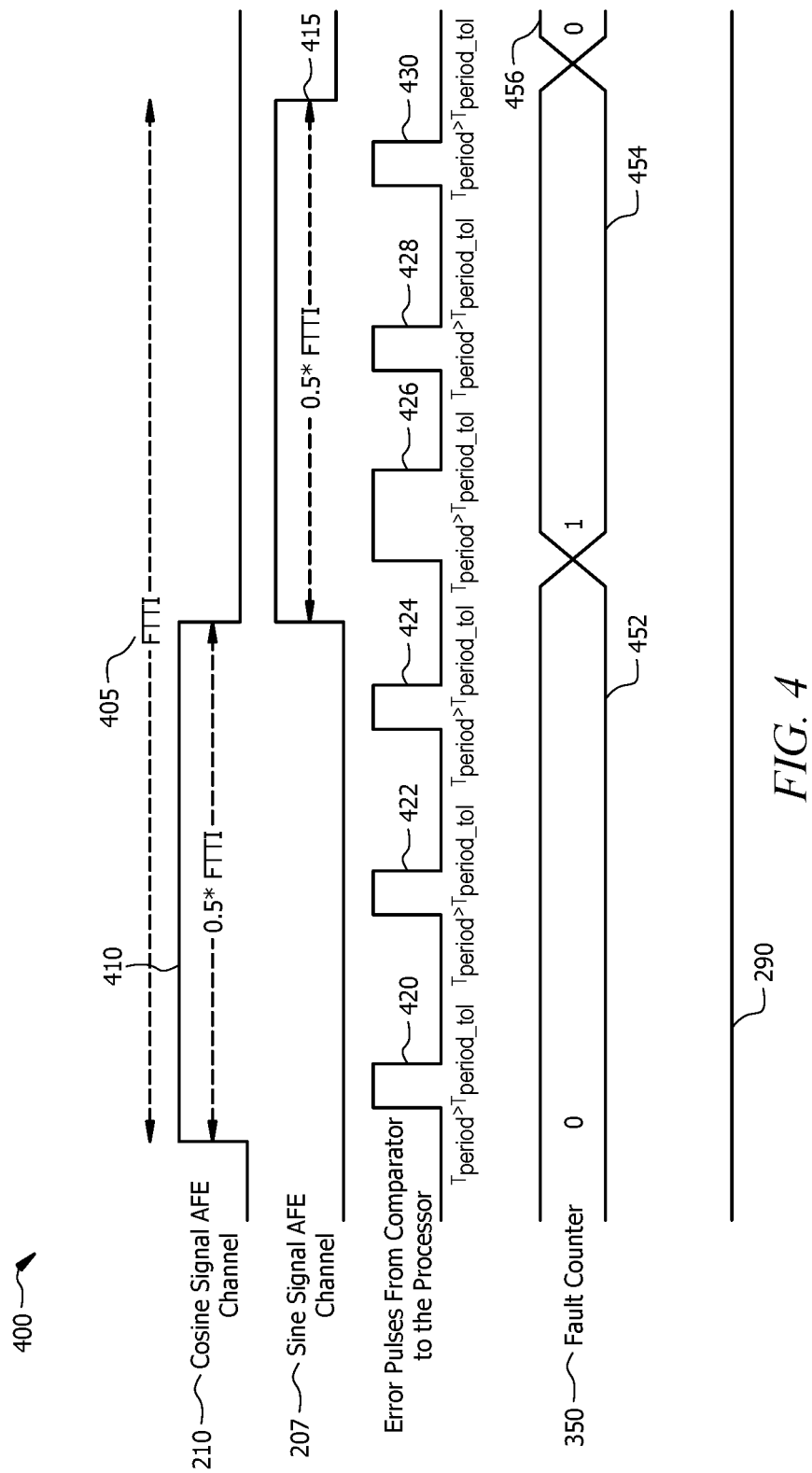
FIG. 4 is an additional timing diagram illustrating signal processing of a cosine and sine signal for error detection in an inductive position sensor, in accordance with an embodiment of the present invention.

FIG. 4 illustrates a timing diagram 400 of exemplary steps performed by the processor 270 to avoid false triggering of a high impedance condition. As shown in this embodiment, the cosine signal AFE channel 210 and the sine signal AFE channel 207 are each monitored for ½ of a FTTI 405 (0.5*FTTI), wherein the cosine signal AFE channel 210 is monitored during a first ½ FTTI 410 and the sine signal AFE channel 207 is monitored during a second ½ FTTI 415.

As shown, during the time that the cosine signal AFE channel 210 is selected, the comparator 240 generates three error pulses 420, 422, 424. In this embodiment, the duration of each of the three error pulses 420, 422, 424 ($T_{period}$) is less than a predetermined error pulse filter period ($T_{period\_tol}$). Error pulses having a pulse duration ($T_{period}$) less than the predetermined error pulse filter period ($T_{period\_tol}$) are not sufficient to increment a fault counter 450. As such, the three pulses 420, 422, 424 generated by the comparator circuit 240 and received at the processor 270 during the first ½ FTTI 410 do not increment the fault counter 450, so the fault counter value remains at "0" 452. Additionally, during the time that the sine signal AFE channel 207 is selected, the comparator 240 generates three error pulses 426, 428, 430. In this embodiment, only the duration ($T_{period}$) of the first error pulse 426 is greater than the predetermined error pulse filter period ($T_{period\_tol}$) and so, the first error pulse 426 results in the fault counter 450 incrementing to a value of "1" 454. Assuming that the predetermined fault counter maximum value is greater than 1, the fault signal 290 from the processor 270 remains de-asserted, e.g. at a low logic value and the output buffers 285 are not set to a high impedance value. As such, in this embodiment, the error pulses 420, 422, 424, 426, 428, 430 received at the processor 270 are filtered and do not result in a fault condition for the system. Additionally, the fault counter is reset to "0" 456 before every FTTI interval 405 since the predetermined fault counter maximum value has not been reached, to prevent accumulation of errors over multiple FTTIs.

Figure 5:
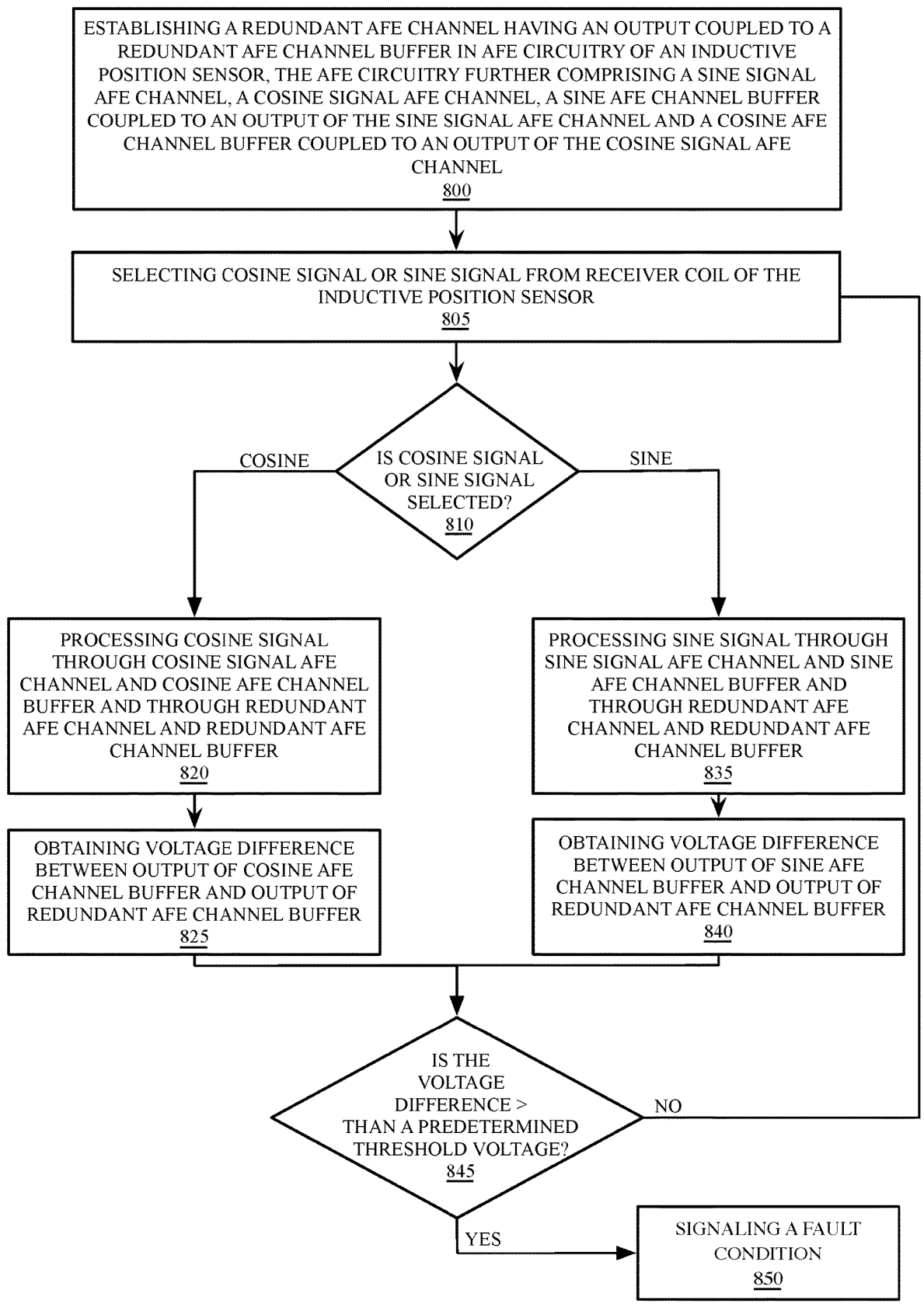
FIG. 5 is a flow diagram illustrating signal processing of a cosine signal and a sine signal for error detection in an inductive position sensor, in accordance with an embodiment of the present invention.

FIG. 5 is a flow diagram illustrating a method for processing of a sine signal and a cosine signal for error detection in an inductive position sensor, in accordance with an embodiment of the present invention. At operation 800, the method begins by establishing a redundant analog front-end (AFE) channel having an output coupled to a redundant AFE channel buffer in AFE circuitry of an inductive position sensor, the AFE circuitry further comprising a sine signal AFE channel, a cosine signal AFE channel, a sine AFE channel buffer coupled to the output of the sine signal AFE channel and a cosine AFE channel buffer coupled to the output of the cosine signal AFE channel. With reference to FIG. 2, a redundant AFE channel 140 having an output coupled to a redundant AFE channel buffer 141, a sine signal AFE channel 207 having an output coupled to a sine AFE channel buffer 286 and a cosine signal AFE channel 210 having an output coupled to a cosine signal AFE channel buffer 287 are established in the AFE circuitry 135 of an inductive position sensor.

At operation 810, the method continues by alternately selecting a sine output signal or a cosine output signal from a receiver coil of the inductive position sensor. As shown in FIG. 2, a sine output signal 120 or a cosine output signal 125 of a receiver coil 130 may be selected by a multiplexer 235.

At operation 820, if the sine signal was selected at operation 810, then the method proceeds by. Alternatively, if the cosine signal was selected at operation 810, the method proceeds at operation 835 by processing the cosine output signal through the redundant AFE channel and the redundant AFE channel buffer when the cosine output signal is selected. As illustrated in FIG. 2, when the sine output signal 120 is selected, the multiplexer 235 provides the sine output signal 120 to the redundant AFE channel 140 and the redundant AFE channel buffer 141 for processing. Alternatively, when the cosine output signal 125 is selected, the multiplexer 235 provides the cosine output signal 125 to the redundant AFE channel 140 and the redundant AFE channel buffer 141 for processing.

If the sine output signal was processed at operation 820, the method continues at operation 825 by obtaining a voltage difference as a difference between an output voltage of the sine AFE channel buffer and an output voltage of the redundant AFE channel buffer. Alternatively, if the cosine output signal was processed at operation 835, the method continued at operation 840 by obtaining the voltage difference as the difference between an output voltage of the cosine AFE channel buffer and an output voltage of the redundant AFE channel buffer. With reference to FIG. 2, the comparator 240 receives either the output of the sine AFE channel buffer 286 or the output of the cosine AFE channel buffer 287 from the multiplexer 230 and compares the output of the redundant AFE channel buffer 141 to the output voltage that is provided by the multiplexer 230.

At operation 845, the method continues by comparing the voltage difference obtained in operation 825 or 840 to a predetermined threshold voltage. At operation 850, the method concludes by signaling a fault condition if operation 845 determined that the voltage difference was greater than the predetermined threshold voltage.

Figure 6:
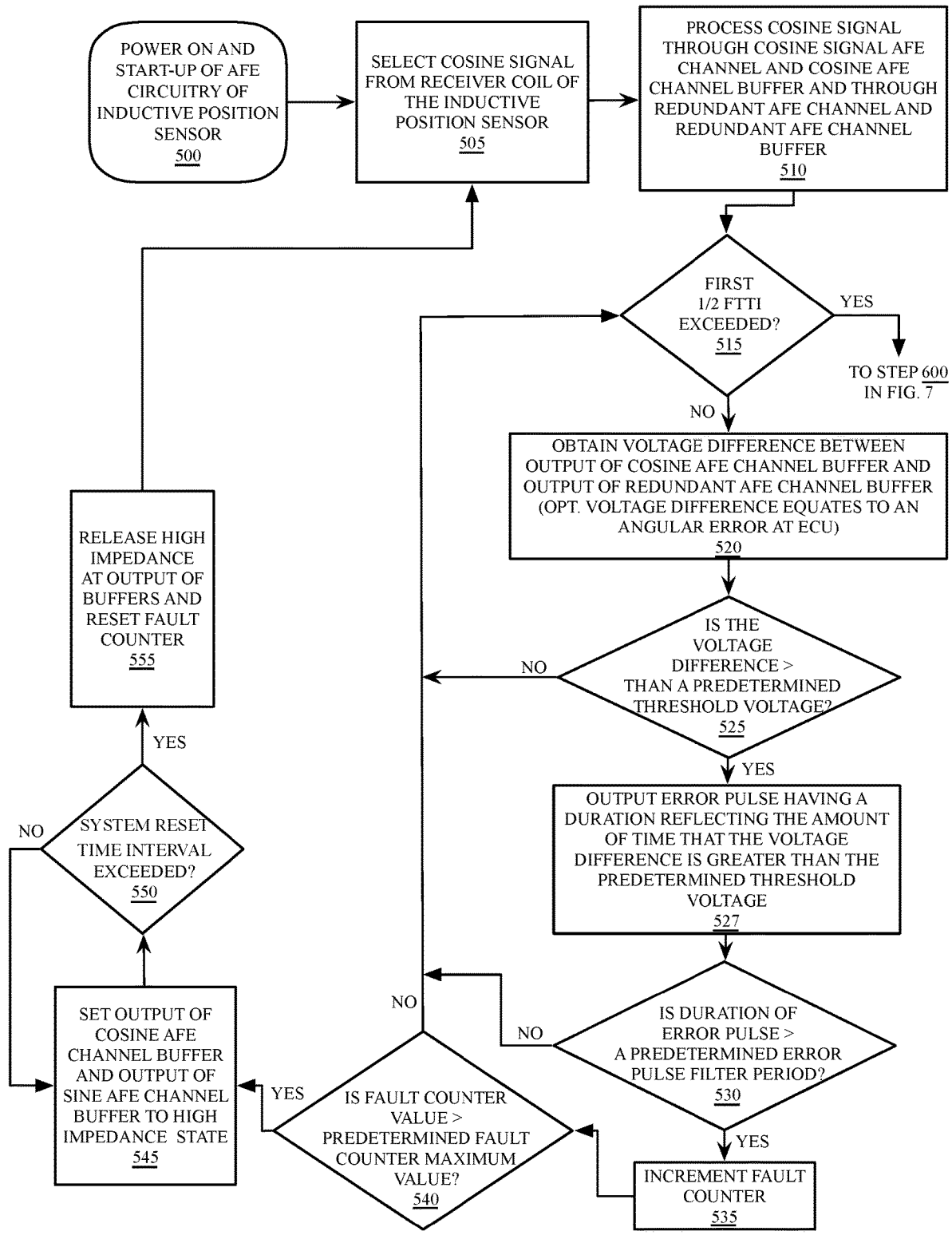
FIG. 6 is a flow diagram illustrating signal processing and filtering of a cosine signal for error detection in an inductive position sensor, in accordance with an embodiment of the present invention.
Figure 7:
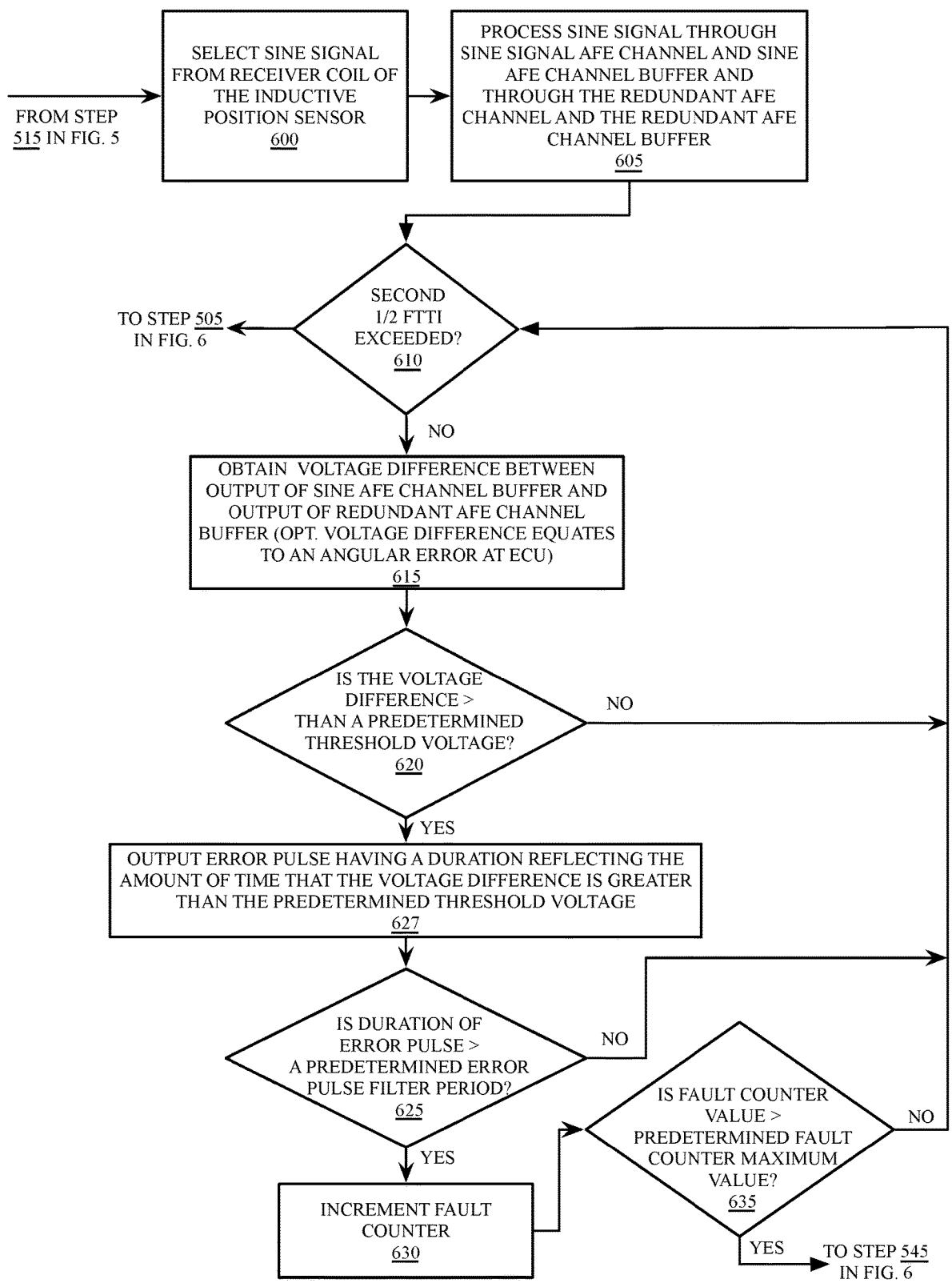
FIG. 7 is a flow diagram illustrating signal processing and filtering of a sine signal for error detection in an inductive position sensor, in accordance with an embodiment of the present invention.

FIG. 6 and FIG. 7 in combination, illustrate a flow diagram of the present invention for monitoring analog front-end (AFE) circuitry of an inductive position sensor. At operation 500, power on and start-up of the AFE circuitry of the inductive position sensor are performed. The AFE circuitry 135 of the inductive position sensor 100 may be as illustrated in FIG. 1.

At operation 505, the cosine signal from the receiver coil of the inductive position sensor is selected. As shown with reference to FIG. 2, the cosine signal 125 of the receiver coil 130 may be selected, particularly the output of cosine AFE channel buffer 287, using a first multiplexer 235 responsive to an output of processor 270.

At operation 510, the cosine signal is processed through the cosine signal AFE channel, the cosine AFE channel buffer, the redundant AFE channel and the redundant AFE channel buffer. As shown with reference to FIG. 2, the redundant AFE channel 140 and the redundant AFE channel buffer 141 are established in the AFE circuitry 135 of the inductive position sensor 100 and the AFE circuitry 135 further includes the cosine signal AFE channel 210 which is fed to cosine AFE channel buffer 287. The cosine signal 125, selected by processor 270, is processed through the redundant AFE channel 140 and the redundant AFE channel buffer 141 responsive to first multiplexer 235 and the output of cosine AFE channel buffer 287 is selected by second multiplexer 230.

At operation 515, it is determined if the first ½ FTTI has been exceeded. If the first ½ FTTI has been exceeded, the method continues at step 600 of FIG. 6. If the first ½ FTTI has not been exceeded, the method continues at operation 520. As previously described with reference to FIG. 3, the cosine signal AFE channel 210 may be monitored during a first ½ of the FTTI, particularly the output of redundant AFE channel buffer 141 is compared with the output of cosine AFE channel buffer 287. As such, when the first ½ FTTI has ended, the system switches to monitoring the sine signal AFE channel 207 during the second ½ FTTI.

At operation 520, a voltage difference between the output of the cosine AFE channel buffer and the output of the redundant AFE channel is obtained. As shown in FIG. 2, the subtractor circuit 245 is used to obtain a voltage difference between the output of the cosine AFE channel buffer 287 and the output of the redundant AFE channel buffer 141 by subtracting an output voltage of the cosine AFE channel buffer 287 and an output voltage of the redundant AFE channel buffer 141 to obtain the voltage difference.

At operation 525, it is determined whether or not the voltage difference is greater than a predetermined threshold voltage. With reference to FIG. 2, the voltage threshold comparators 252, 262 of the comparator circuit 240 are used to compare the predetermined threshold voltages 250, 260 to the voltage difference output by the subtractor circuit 245 to determine if the voltage difference is greater than the predetermined threshold voltages 250, 260, either by being greater than the predetermined positive threshold voltage 250 or being more negative than the predetermined negative threshold voltage 260. If, and only if, the voltage difference is greater than the predetermined threshold voltage, an error pulse is output at operation 527, the error pulse having a duration reflecting the amount of time that the voltage difference is greater than the predetermined threshold voltage.

In a particular embodiment, operations 530, 535 and 540 are optionally performed. In the event that they are not performed, when the error pulse is output at operation 527, operation 545 is performed.

At operation 530, when it is determined at operation 525 that the voltage difference between the output of the cosine signal AFE channel and the output of the redundant AFE channel is greater than a predetermined threshold voltage, and thus the error pulse is output at operation 527, it is then determined if the duration of the error pulse is greater than a predetermined error pulse filter period. As previously described with reference to FIG. 2 and FIG. 3, the comparator circuit 240 generates error pulses when the voltage difference between the output of the cosine signal AFE channel and the output of the redundant AFE channel is greater than a predetermined threshold voltage, such as pulses 320, 322, 324 and 326 of FIG. 3. The processor 270 then determines if the duration ($T_{period}$) of the error pulses 320, 322, 324, 326 is greater than a predetermined error pulse filter period ($T_{period\_tot}$).

At operation 535, if it is determined that the duration of the error pulse is greater than a predetermined error pulse filter period ($T_{period\_tot}$) at operation 530, then a fault counter is incremented. With reference to FIG. 3, the fault counter 350 is incremented for each of error pulses 320, 322, 324, 325 because the duration of each of these pulses is greater than the predetermined error pulse filter period ($T_{period\_tot}$). The fault counter is not incremented if the duration of an error pulse ($T_{period}$) is not greater than the predetermined error pulse filter period ($T_{period\_tot}$), as described in relation to error pulses 420, 422 and 424 of FIG. 4. As previously described, the incrementation of the fault counter may be accomplished within the algorithm of the processor 270.

At operation 540 it is determined whether or not the fault counter value is greater than a predetermined fault counter maximum value. With reference to FIG. 2, the processor 270 can be used to determine if the value of the fault counter 350 is greater than a predetermined fault counter maximum value. If the fault counter maximum value has not been exceeded, the method returns to operation 515 until the first ½ FTTI has been exceeded.

If the fault counter maximum value has been exceeded, the method continues at operation 545 where the output of the buffers are set to a high impedance state. With reference to FIG. 2 and FIG. 3, when the fault counter 350 has reached a value of 4, the fault signal 290 from the processor 270 is asserted to set the output of buffers 285 into a high impedance state. Setting the output of buffers 285 to a high impedance will signal a fault condition to the ECU, as previously described with reference to FIG. 2.

At operation 550, it is determined whether or not a system reset time interval ($T_{reset}$) has been exceeded. The system reset time interval ($T_{reset}$) is predetermined and known by the processor 270.

At operation 555, if it is determined at operation 550 that the system reset time interval ($T_{reset}$) has been exceeded, then the high impedance state of the output of the buffers 285 is released and the fault counter is reset. If the system reset time interval ($T_{reset}$) has not been exceeded, then the method returns to operation 545 and the high impedance output state of the buffers 285 is maintained. With reference to FIG. 3, at the end of the second ½ FTTI 315, the fault counter is reset to "0" 334. Following the reset of the fault counter and the release of the high impedance state of the output of the buffers 285, the method returns to operation 505.

After the first ½/FTTI has been exceeded at operation 515, the method continues at operation 600, where the sine signal from the receiver coil of the inductive position sensor is selected. As shown with reference to FIG. 2, the sine signal 120 of the receiver coil 130 may be selected, particularly the output of sine AFE channel buffer 286 using the first multiplexer 235 responsive to an output of processor 270.

At operation 605, the sine signal is processed through the sine signal AFE channel and the sine AFE channel buffer and also through the redundant AFE channel and the redundant AFE channel buffer. As shown with reference to FIG. 2, the redundant AFE channel 140 in established in the AFE circuitry 135 of the inductive position sensor 100 and the AFE circuitry 135 further includes a sine signal AFE channel 207 whose output is fed to sine AFE channel buffer 286. The sine signal 120, selected by processor 270, is processed through the redundant AFE channel 140 and redundant AFE channel buffer 141 responsive to first multiplexer 235 and the output of sine AFE channel buffer 286 is selected by second multiplexer 230.

At operation 610, it is determined if the second ½ FTTI has been exceeded. If the second ½ FTTI has been exceeded, the method continues at step 505 of FIG. 5, wherein the cosine signal is selected. If the second ½ FTTI has not been exceeded, the method continues at operation 615. As previously described with reference to FIG. 3, the sine signal AFE channel 210 may be monitored during a second ½ of the FTTI, particularly the output of redundant AFE channel buffer 141 is compared with the output of sine AFE channel buffer 286. As such, when the second ½ FTTI has ended, the system switches to monitoring the cosine signal AFE channel 207 during the first ½ FTTI.

At operation 615 a voltage difference between the output of the sine AFE channel buffer and the output of the redundant AFE channel is obtained. As shown in FIG. 2, the subtractor circuit 245 is used to obtain a voltage difference between the output of the sine AFE buffer channel 286 and the output of the redundant AFE channel buffer 141 by subtracting an output voltage of the sine AFE channel buffer 286 with an output voltage of the redundant AFE channel buffer 141 to obtain the voltage difference.

At operation 620, it is determined whether or not the voltage difference is greater than a predetermined threshold voltage. With reference to FIG. 2, the voltage threshold comparators 252, 262 of the comparator circuit 240 are used to compare the predetermined threshold voltages 250, 260 to the voltage difference output by the subtractor circuit 245 to determine if the voltage difference is greater than the predetermined threshold voltages 250, 260, either by being greater than the predetermined positive threshold voltage 250 or being more negative than the predetermined negative threshold voltage 260. If, and only if, the voltage difference is greater than the predetermined threshold voltage, an error pulse is output at operation 627, the error pulse having a duration reflecting the amount of time that the voltage difference is greater than the predetermined threshold voltage.

In a particular embodiment, operations 625, 630 and 635 are optionally performed. In the event that they are not performed, when the error pulse is output at operation 627, operation 545 is again performed.

At operation 625, it is then determined if the duration of the error pulse is greater than a predetermined error pulse filter period. As previously described with reference to FIG. 2 and FIG. 3, the comparator circuit 240 generates error pulses when the voltage difference between the output of the cosine signal AFE channel and the output of the redundant AFE channel is greater than a predetermined threshold voltage, such as pulses 320, 322, 324 and 326 of FIG. 3. The processor 270 then determines if the duration ($T_{period}$) of the error pulses 320, 322, 324, 326 is greater than a predetermined error pulse filter period ($T_{period\_tot}$).

At operation 630, if it is determined that the duration of the error pulse is greater than a predetermined error pulse filter period ($T_{period\_tot}$) at operation 625, then a fault counter is incremented. With reference to FIG. 3, the fault counter 350 is incremented for each of error pulses 320, 322, 324, 325 because the duration of each of these pulses is greater than the predetermined error pulse filter period ($T_{period\_tot}$). The fault counter is not incremented if the duration of an error pulse ($T_{period}$) is not greater than the predetermined error pulse filter period ($T_{period\_tot}$), as described in relation to error pulses 420, 422 and 424 of FIG. 4. As previously described, the incrementation of the fault counter may be accomplished within the algorithm of the processor 270.

At operation 635 it is determined whether or not the fault counter value is greater than a predetermined fault counter maximum value. With reference to FIG. 2, the processor 270 can be used to determine if the value of the fault counter 350 is greater than a predetermined fault counter maximum value. If the fault counter maximum value has not been exceeded, the method returns to operation 610 until the second ½ FTTI has been exceeded.

If it is determined at operation 635 that the fault counter maximum value has been exceeded, the method continues at operation 545 of FIG. 5, where the output of the buffers are set to a high impedance state. With reference to FIG. 2 and FIG. 3, when the fault counter 350 has reached a value of 4, the fault signal 290 from the processor 270 will be used to set the output of buffers 285 into a high impedance state. Setting the output signal to a high impedance will signal a fault condition to the ECU, as previously described with reference to FIG. 2.

The method continues at operation 545 of FIG. 5, wherein the high impedance state is maintained until the system reset time interval ($T_{reset}$) is exceeded. After the system reset time interval ($T_{reset}$) has been exceeded, the high impedance output state is released and the fault counter is reset, as in operation 555 of FIG. 5.

As previously described, the voltage difference between the sine signal AFE channel or the cosine signal AFE channel and the redundant AFE channel may be attributed to one or more error sources. The error sources may be any of offset errors, common mode errors, gain errors, sine or cosine AFE channel short to ground errors, sine or cosine AFE channel short to supply errors, sine or cosine AFE channel output stuck at random voltage errors, gain variation errors, errors resulting from a delay between the sine and cosine AFE channels and errors resulting from generated harmonics.

FIG. 8 is a flow diagram illustrating steps for determining the predetermined threshold voltage attributed to one or more error sources which equates to a predetermined angular error at the ECU.

At operation 700, the method proceeds by selecting a predetermined angular error threshold for generating a fault condition at the ECU. In a particular embodiment, the predetermined angular threshold may be greater than 3° and may be determined based upon desired ASIL ratings. The fault condition at the ECU may be attributed to one or more sources of error including, but are not limited to, offset errors, common mode errors, gain errors, sine or cosine AFE channel short to ground errors, sine or cosine AFE channel short to supply errors, sine or cosine AFE channel output stuck at random voltage errors, gain variation errors, errors resulting from a delay between the sine and cosine AFE channels and errors resulting from generated harmonics.

At operation 710, the method continues by determining a predetermined threshold voltage as a voltage difference between the output voltage of the sine AFE channel buffer or the cosine AFE channel buffer and the output voltage of the redundant AFE channel buffer that would equate to the predetermined angular error threshold at the ECU.

Error-free, or ideal, sine and cosine output signals are considered to be unaffected by errors. As such, ideal sine and cosine output signals may be defined as:

Ideal sine AFE channel buffer 285 at OUT2P/N 145=$A_s*\text{Sin}(\Theta)$ Ideal cosine AFE channel buffer 287 at OUT1P/N 150=$A_c*\text{Cosine}(\Theta)$ Where $A_s$ and $A_c$ are the amplitudes of the output voltage at OUT2P/N 145 and OUT1P/N 150, respectively.

Additionally, sine and cosine output signals that have been affected by errors may be given as:

Error Affected Sine AFE channel buffer 285 at OUT2P/N 145=$\text{Vos}_s+(A_s*(1+\Delta A_s))*\text{Sin}(\Theta+\Delta\Theta_s)$ Error Affected Cosine AFE channel buffer 287 at OUT1P/N 150=$\text{Vos}_c+(A_c*(1+\Delta A_c))*\text{Cos}(\Theta+\Delta\Theta_c)$ where;

$\text{Vos}_s$→Offset at OUT2P/N 145 of sine channel buffer 285

$\text{Vos}_c$→Offset at OUT1P/N 150 of cosine channel buffer 287

$\Delta A_s$→Gain error coefficient at OUT2P/N 145 of sine channel buffer 285

$\Delta A_c$→Gain error coefficient at OUT1P/N 150 of cosine channel buffer 287

$\Delta\Theta_s$→Gain error coefficient at OUT2P/N 145 of sine channel buffer 285

$\Delta\Theta_c$→Gain error coefficient at OUT1P/N 150 of cosine channel buffer 287

Sine and cosine waveforms that are unaffected by errors, and sine and cosine waveforms that are affected by errors, can be calculated and plotted using the above equations. In the illustrated embodiments, only the offset voltage, gain error and phase error are described. However, this is not intended to be limiting, and other errors may be similarly incorporated into the equations and the relationship between the angle error and the predetermined voltage threshold can be determined from corresponding plots. The plots can be used to identify the relationship between the angle error and the predetermined threshold voltage.

Figure 9A:
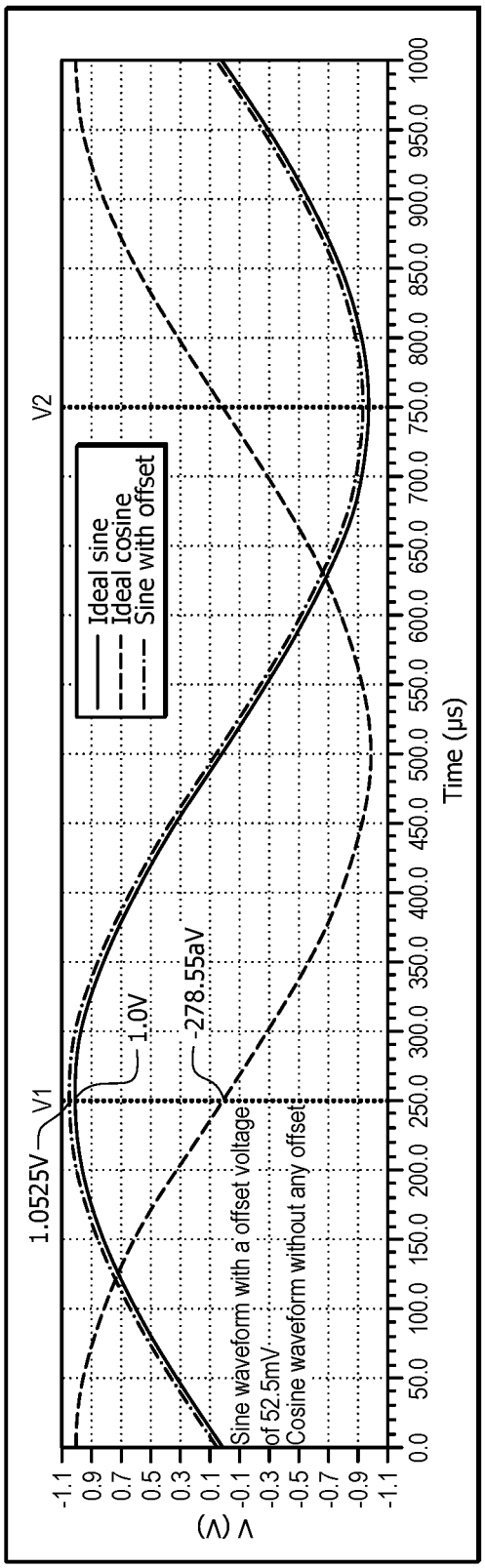
FIG. 9A is a plot illustrating a 52.5 mV offset error on a sine output signal, assuming a 1Vp sine/cosine amplitude.

For example, the plot illustrated in FIG. 9A shows an ideal cosine waveform, an ideal sine waveform and an erroneous sine waveform having a positive offset voltage of 52.5 mV. In this illustration, the waveforms are illustrated for a single-ended output, wherein the output of the subtractor circuit 245 will be either +52.5 mV or −52.5 mV. However, for a system utilizing two differential outputs, there will be a dedicated subtractor circuit for each of the two differential outputs, such that one subtractor will have an output of +52.5 mV and the other subtractor will have an output of −52.5 mV, depending upon the polarity of the offset voltage. In this exemplary embodiment, the ideal sine waveform represents the output of the redundant AFE channel buffer 140, the erroneous sine waveform represents the output of the sine AFE channel buffer 286, and the ideal cosine waveform represents the output of cosine AFE channel buffer 287. The frequency of the waveforms are each 1 KHz and the peak value of the waveforms are each 1V. The offset voltage introduced into the ideal sine waveform to provide the erroneous sine waveform represents an error resulting from any single point failure in the sine signal AFE channel 207 or the sine AFE channel buffer 286. The pointers V1 and V2 show the voltages of the three waveforms at two different points over a waveform cycle. From these pointers, it can be understood that the voltage difference between the ideal sine waveform and the erroneous sine waveform is 52.5 mV. As such, an output of the subtractor circuit 245 will be a constant DC value and have a difference of +52.5 mV at the non-inverting input of the positive threshold voltage comparator 252 and at the inverting input of the negative threshold voltage comparator 262 over the waveform cycle. When the predetermined positive threshold voltage 250 and the predetermined negative threshold voltage 260 are set to +/−52.5 mV, respectively, representing an angular error threshold of +/−3° at the ECU 155, the output of the positive threshold voltage comparator 252 will be high over the waveform cycle. Similarly, in the event that the voltage difference between the ideal sine waveform and the erroneous sine waveform is −52.5 mV over the waveform cycle, the output of the negative threshold voltage comparator 262 will be high over the waveform cycle. In combination, the output of one of the comparators 252, 262 will be high whenever there is an offset voltage error greater than absolute 52.5 mV.

Figure 9B:
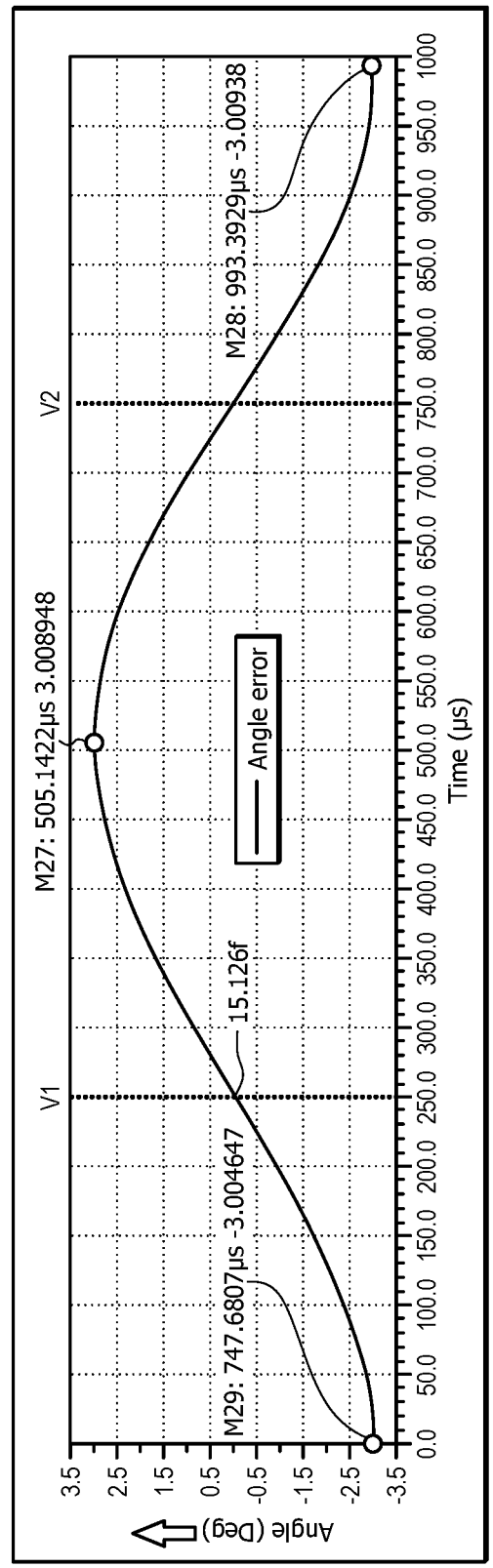
FIG. 9B is a plot illustrating an angular error profile resulting from the 52.5 mV offset error on the sine output signal in FIG. 9A.

FIG. 9B illustrates the angular error waveform over the waveform period of FIG. 9A, which is calculated by taking the arctangent of the ratio between the erroneous sine waveform and the ideal cosine waveform. The angular error waveform has the same frequency as that of the waveforms in FIG. 9A. Markers M27, M28 and M29 show the points where the angular error waveform crosses 3°. As such, it can be understood that a voltage offset error of 52.5 mV in a sine waveform with a peak voltage of 1V results in about a +/−3° angular error. Accordingly, the implementation illustrated in FIG. 9A and FIG. 9B determines that the angular error is greater than +/−3° whenever there is a voltage offset error in the sine waveform that is greater than, or equal to 52.5 mV, with a peak voltage of 1V. A similar explanation is applicable when the sine waveform is ideal and the cosine waveform is erroneous. Additionally, the relationship between the voltage offset error and the predetermined threshold voltage scales linearly. It follows that, for a sine or cosine waveform having a peak voltage of 2V, the predetermined voltage threshold corresponding to +/−3° angular error is about 52.5 mV*2=105 mV. Similarly, the predetermined threshold voltage corresponding to +/−6° for a 1V peak waveform is about 52.5 mV*2=105 mV.

Figure 10A:
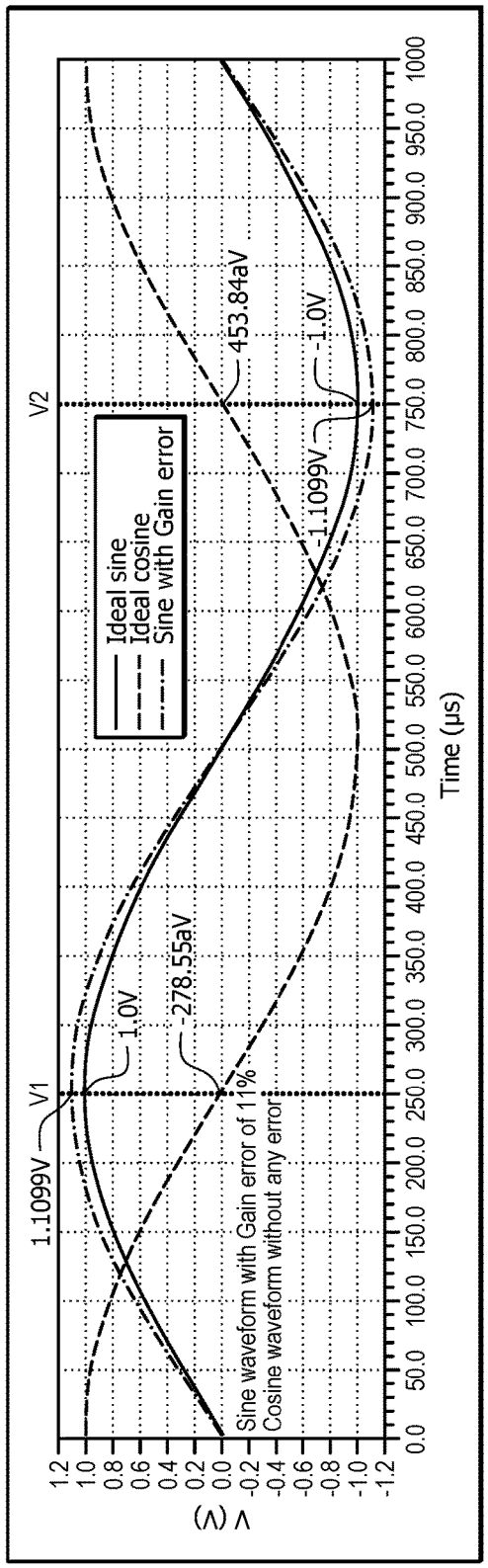
FIG. 10A is a plot illustrating a 11% gain error on a sine output signal, assuming a 1Vp sine/cosine amplitude.

FIG. 10A shows an ideal cosine waveform, an ideal sine waveform and an erroneous sine waveform having a gain error of 11%. In this exemplary embodiment, the ideal sine waveform represents the output of the redundant AFE channel buffer 140, the erroneous sine waveform represents the output of the sine AFE channel buffer 286, and the ideal cosine waveform represents the output of cosine AFE channel buffer 287. The frequency of the waveforms is 1 KHz and the peak value of the ideal waveforms are 1V. The gain error introduced into the ideal sine waveform to provide the erroneous sine waveform represents an error resulting from any single point failure in the sine signal AFE channel 207 or the sine AFE channel buffer 286. The pointers V1 and V2 show the voltages of the three waveforms at two different points over a waveform cycle. From these pointers, it can be seen that the voltage difference between the ideal sine waveform and the erroneous sine waveform is about +/−110 mV varying in sign over the waveform cycle, which is equivalent to a gain error of approximately 11%. As such, an output of the subtractor circuit 245 will provide a peak error voltage of +110 mV at the input to comparator 252 and peak error voltage of −110 mV at the input of the negative threshold voltage comparator 262, over the waveform cycle. When the predetermined positive threshold voltage 250 and the predetermined negative threshold voltage 260 are respectively set to +/−52.5 mV, the outputs of the comparators 252, 262 respectively toggle from low to high whenever there is an gain error greater than absolute +/−5.25% of the peak voltage.

Figure 10B:
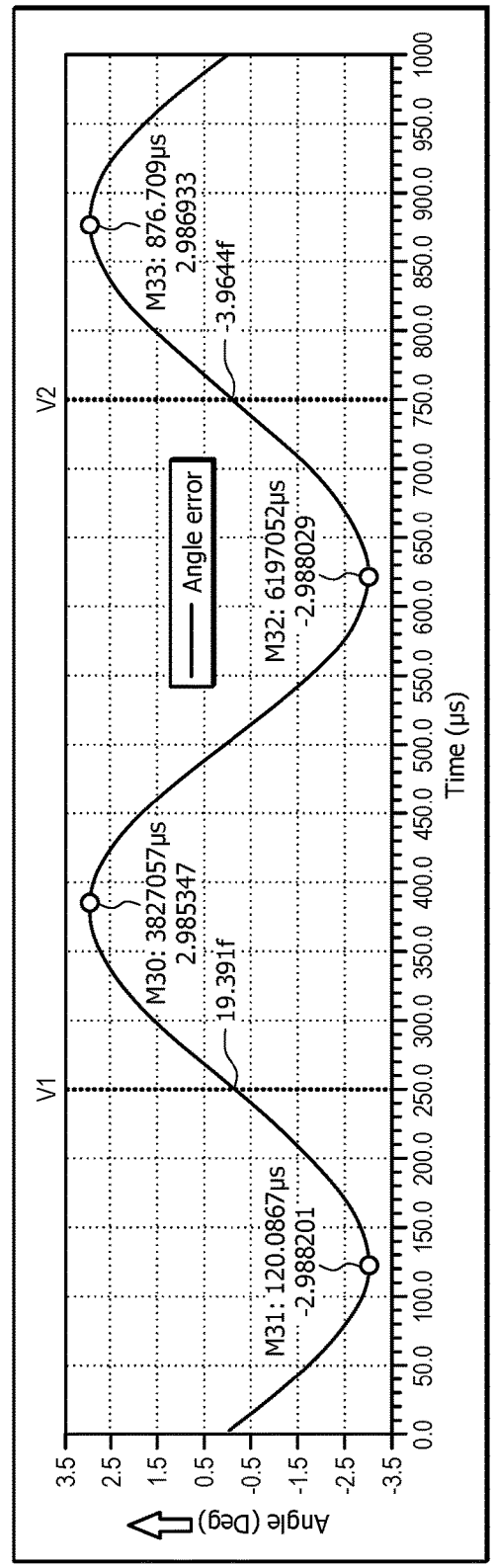
FIG. 10B is a plot illustrating an angular error profile resulting from the 11% gain error on the sine output signal of FIG. 10A.

FIG. 10B illustrates the angular error waveform over the waveform period of FIG. 10A, which is calculated by taking the arctangent of the ratio between the erroneous sine waveform and the ideal cosine waveform. The angular error waveform has twice the frequency as that of the waveforms in FIG. 10A. Markers M30, M31, M32 and M33 show the respective peaks, which are the points where the angular error waveform is about 3°. As such, it can be understood that a gain error of 11% in a sine waveform with a peak voltage of 1V results in a maximum of about a +/−3° angular error. The angle error depicted by the pointers V1 and V2 are 19.391 femtodegree and −3.9644 femtodegree, respectively. It is provided to understand the nature of angle error, i.e. that the angle error goes to 0 degrees within the waveform cycle.

In the implementation illustrated in FIG. 10A and FIG. 10B the threshold voltage is set to +/−52.5 mV corresponding to an angular error threshold for a +/−3° error. However, as is shown in FIG. 10A and FIG. 10B, a gain error of 11%, which is the voltage difference of +/−110 mV between the ideal waveform and the erroneous waveform, results in about a +/−3° error. So, the voltage threshold corresponding to the gain error is higher than the voltage threshold corresponding to other potential sources of error, such as the voltage offset error shown in FIG. 9A and FIG. 9B. In this exemplary embodiment, the voltage threshold is set to a minimum threshold voltage that results in a +/−3° angular error considering all of the potential sources of error. Accordingly, this implementation triggers a fault whenever there is a gain error in the sine waveform greater than 5.25%, assuming a peak voltage of 1V. The corresponding angular error for a +/−5.25% gain error is +/−1.47°. A similar explanation is applicable for the scenario where the sine waveform is an ideal waveform and the cosine waveform is erroneous.

Figure 11A:
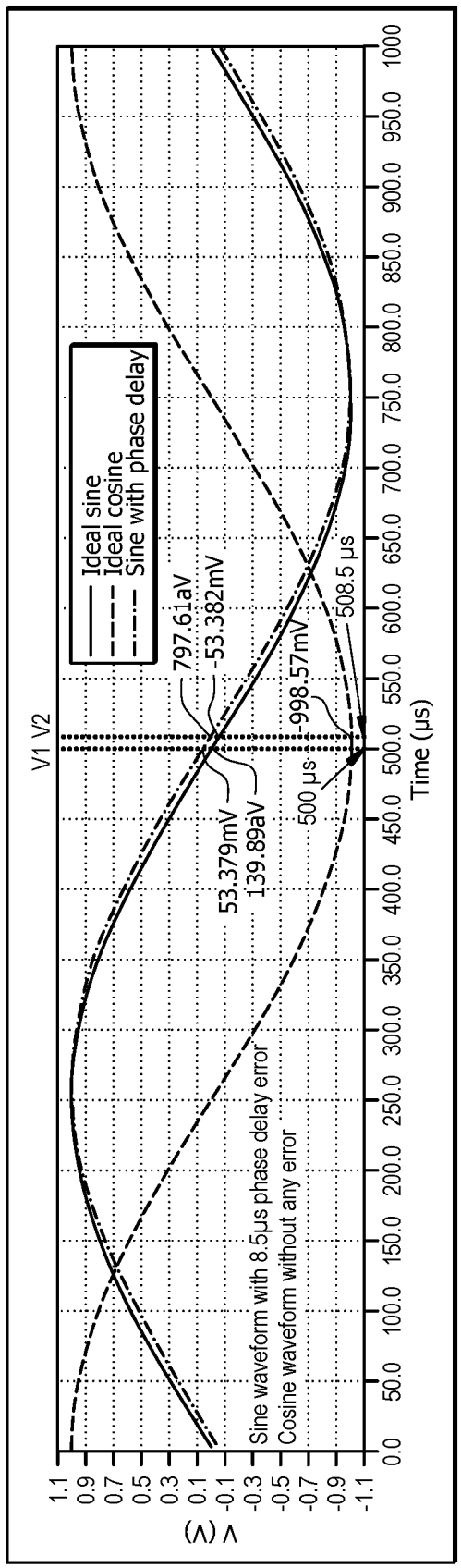
FIG. 11A is a plot illustrating an 8.5 μs phase error on a sine output signal, assuming a 1Vp sine/cosine amplitude.

FIG. 11A shows an ideal cosine waveform, an ideal sine waveform and an erroneous sine waveform having a time delay of 8.5 μs from the ideal sine waveform. In this exemplary embodiment, the ideal sine waveform represents the output of the redundant AFE channel buffer 140, the erroneous sine waveform represents the output of the sine AFE channel buffer 286, and the ideal cosine waveform represents the output of cosine AFE channel buffer 287. The frequency of the waveforms is 1 KHz and the peak value of the waveforms is 1V. The time delay (propagation delay) introduced into the ideal sine waveform to provide the erroneous sine waveform represents an error resulting from any single point failure in the sine signal AFE channel 207 or the sine AFE channel buffer 286. The pointers V1 and V2 show the voltages of the three waveforms at two different points over a waveform cycle. The two pointers at 500 μs and at 508.5 μs identify the zero crossing of the waveforms and also show that the time delay between the ideal sine waveform and the erroneous sine waveform is 8.5 μs, wherein 139.89aV (139.89*10$^{-18}$~0V) and 797.61aV (797.61*10$^{-18}$V~0V) indicate the zero crossing for the ideal sine waveform and the erroneous sine waveform, respectively. From the 500 μs pointer and the 508.5 μs pointer, it can be seen that the voltage difference between the ideal sine waveform and the erroneous sine waveform is about +/−52.5 mV. As such, an output of the subtractor circuit 245 will have a difference of about +52.5 mV at the input of the positive threshold voltage comparator 252 and a difference of about −52.5 mV at the input of the negative threshold voltage comparator 262, each at respective times over the waveform cycle. When the predetermined positive threshold voltage 250 and the predetermined negative threshold voltage 260 are respectively set to +/−52.5 mV for an angular error threshold of about +/−3° at the ECU 155, the outputs of the respective comparators 252, 262 toggle from low to high whenever there is a time delay which corresponds to an error voltage greater than absolute 52.5 mV.

Figure 11B:
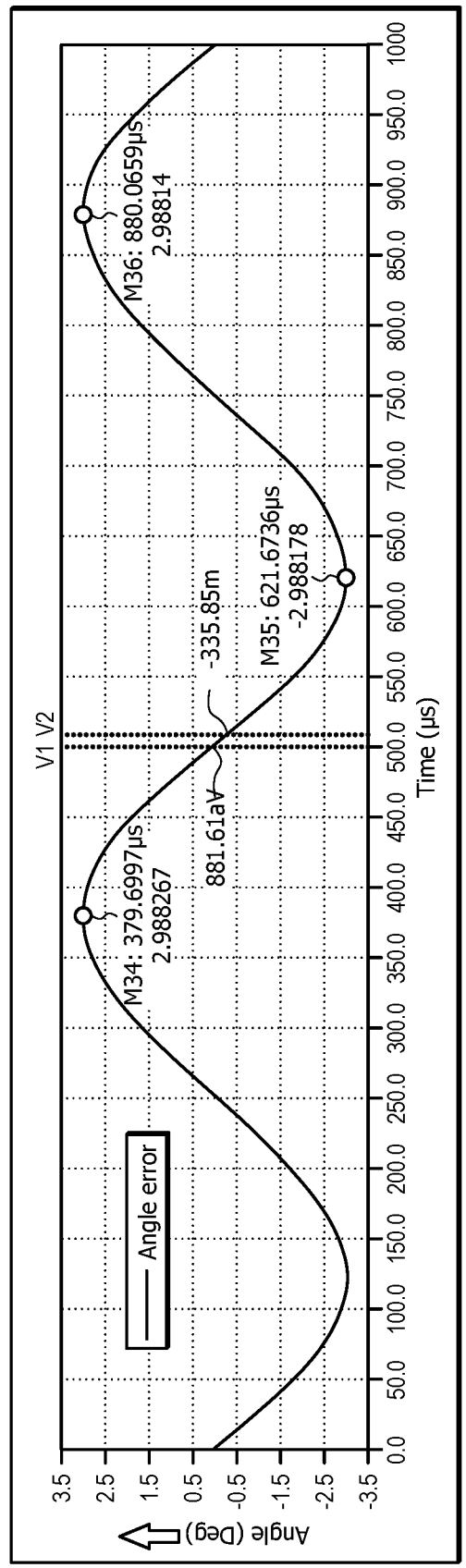
FIG. 11B is a plot illustrating an angular error profile resulting from the 8.5 μs phase error on the sine output signal of FIG. 11A.

FIG. 11B illustrates the angular error waveform over the waveform period of FIG. 11A, which is calculated by taking the arctangent of the ratio between the erroneous sine waveform and the ideal cosine waveform. The angular error waveform has twice the frequency as that of the waveforms in FIG. 11A. Markers M34, M35 and M35 show the points in time when the angular error waveform is about +/−3°, where 881.61aV (881.61*10$^{-18}$ V~0V) indicates the waveform zero crossing and −335.85 mDeg indicates the angle error in degrees at the zero crossing. As such, it can be understood that a time delay (phase error) of 8.5 μs, which corresponds to an error voltage of about +/−52.5 mV in a sine waveform with a peak voltage of 1V, results in an angular error of about +/−3°. Accordingly, the implementation illustrated in FIG. 11A and FIG. 11B illustrates that the angular error is about +/−3° whenever there is a phase error in the sine waveform that is about 8.5 μs, with a peak voltage of 1V and a frequency of 1 KHz. A similar explanation is applicable for the scenario where the sine waveform is ideal and the cosine waveform is erroneous. Additionally, the relationship between the phase error and the predetermined threshold voltage scales linearly.

As such, the present invention provides an improved system and method for monitoring AFE circuitry of an inductive position sensor. The method prevents errors resulting from analog signal processing at the AFE circuitry to result in fault conditions at the ECU.

In one embodiment, portions of the AFE circuitry may be implemented in an integrated circuit on a single semiconductor die. Alternatively, the integrated circuit may include multiple semiconductor die that are electrically coupled together such as, for example, a multi-chip module that is packaged in a single integrated circuit package.

In various embodiments, portions of the system of the present invention may be implemented in a Field Programmable Gate Array (FPGA) or Application Specific Integrated Circuit (ASIC). As would be appreciated by one skilled in the art, various functions of circuit elements may also be implemented as processing steps in a software program. Such software may be employed in, for example, a digital signal processor, a network processor, a microcontroller or general-purpose computer.

Unless specifically stated otherwise as apparent from the discussion, it is appreciated that throughout the description, discussions utilizing terms such as "receiving", "determining", "generating", "limiting", "sending", "counting", "classifying", or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention may be embodied on various computing platforms that perform actions responsive to software-based instructions. The following provides an antecedent basis for the information technology that may be utilized to enable the invention.

The method of the present invention may be stored on a computer readable medium which may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java, C #, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Further, for purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

What is claimed is:

1. A method for monitoring analog front-end (AFE) circuitry of an inductive position sensor, the method comprising:
    establishing a redundant analog front-end (AFE) channel having an output coupled to a redundant AFE channel buffer in AFE circuitry of an inductive position sensor, the AFE circuitry further comprising a sine signal AFE channel, a cosine signal AFE channel, a sine AFE channel buffer coupled to the output of the sine signal AFE channel and a cosine AFE channel buffer coupled to the output of the cosine signal AFE channel;
    alternately selecting a sine output signal or a cosine output signal from a receiver coil of the inductive position sensor;
    processing the sine output signal through the redundant AFE channel and the redundant AFE channel buffer when the sine output signal is selected or processing the cosine output signal through the redundant AFE channel and the redundant AFE channel buffer when the cosine output signal is selected;
        when the sine output signal is selected, obtaining a voltage difference as a difference between an output voltage of the sine AFE channel buffer and an output voltage of the redundant AFE channel buffer;
        when the cosine output signal is selected, obtaining the voltage difference as the difference between an output voltage of the cosine AFE channel buffer and an output voltage of the redundant AFE channel buffer; and
    signaling a fault condition if the voltage difference is greater than a predetermined threshold voltage.

2. The method of claim 1, wherein the voltage difference equates to an angular error at an electronic control unit (ECU) coupled to the inductive position sensor.

3. The method of claim 2, wherein the predetermined threshold voltage equates to a predetermined angular error threshold at the ECU.

4. The method of claim 3, wherein the predetermined angular error threshold is greater than about 3°.

5. The method of claim 1, further comprising outputting an error pulse having a duration reflective of an amount of time that the obtained voltage difference is greater than the predetermined threshold voltage.

6. The method of claim 5, further comprising:
    setting an output of the sine AFE channel buffer and an output of the cosine AFE channel buffer to a high impedance state; and
    releasing the high impedance state of the output of the sine AFE channel buffer and the output of the cosine AFE channel buffer after a system reset time interval has been exceeded.

7. The method of claim 5, further comprising:
    comparing the duration of the error pulse to a predetermined error pulse filter period; and
    incrementing a fault counter if the duration of the error pulse is greater than the predetermined error pulse filter period.

8. The method of claim 7, further comprising:
    comparing the fault counter to a predetermined fault counter maximum value; and
    setting an output of the sine AFE channel buffer and an output of the cosine AFE channel buffer to a high impedance state when a value of the fault counter is greater than the predetermined fault counter maximum value.

9. The method of claim 8, further comprising resetting the fault counter if the value of the fault counter is not greater than the predetermined fault counter maximum value within a fault tolerant time interval (FTTI).

10. The method of claim 9, further comprising, releasing the high impedance state of the output of the sine AFE channel buffer and the output of the cosine AFE channel buffer after a system reset time interval has been exceeded.

11. The method of claim 1, wherein the voltage difference is a result of one or more error sources at the AFE circuitry of the inductive position sensor.

12. The method of claim 11, wherein the one or more error sources resulting in the voltage difference are attributed to at least one of offset errors, common mode errors, gain errors, sine or cosine AFE channel short to ground errors, sine or cosine AFE channel short to supply errors, sine or cosine AFE channel output stuck at random voltage errors, gain variation errors, errors resulting from a delay between the sine and cosine AFE channels and errors resulting from generated harmonics.

13. The method of claim 1, wherein the inductive position sensor is selected from a rotary position sensor and a linear position sensor.

14. A method for monitoring analog front-end (AFE) circuitry of an inductive position sensor,
    the method comprising:
    establishing a redundant analog front-end (AFE) channel in an inductive position sensor having an output coupled to a redundant AFE channel buffer, the AFE circuitry further comprising a sine signal AFE channel, a cosine signal AFE channel, a sine AFE channel buffer coupled to an output of the sine signal AFE channel and a cosine AFE channel buffer;

alternately selecting a sine output signal or a cosine output signal from a receiver coil of the inductive position sensor;

processing the sine output signal through the redundant AFE channel and the redundant AFE channel buffer when the sine output signal is selected or processing the cosine output signal through the redundant AFE channel and the redundant AFE channel buffer when the cosine output signal is selected;

when the sine output signal is selected obtaining a voltage difference as a difference between an output voltage of the sine AFE channel buffer and an output voltage of the redundant AFE channel buffer;

when the cosine output signal is selected, obtaining the voltage difference as the difference between an output voltage of the cosine AFE channel buffer and an output voltage of the redundant AFE channel buffer;

determining if the obtained voltage difference is greater than a predetermined threshold voltage and if it is determined that the voltage difference is greater than the predetermined threshold voltage:

outputting an error pulse having a duration reflective of an amount of time that the obtained voltage difference is greater than the predetermined threshold voltage;

determining if the duration of the error pulse is greater than a predetermined error pulse filter period, and if it is determined that the duration of the error pulse is greater than the predetermined error pulse filter period:

incrementing a fault counter; and determining if a value of the fault counter is greater than a predetermined fault counter maximum value, and if it is determined that the fault counter is greater than the predetermined fault counter maximum value, setting an output of the sine AFE channel buffer and an output of the cosine AFE channel buffer to a high impedance state.

15. A system for monitoring analog front-end (AFE) circuitry of an inductive position sensor, the system comprising:

a redundant AFE channel;

a redundant AFE channel buffer coupled to an output of the redundant AFE channel;

a processor; and a comparator circuit, the processor to:
alternately select a sine output signal or a cosine output signal from a receiver coil of an inductive position sensor;

feed the sine output signal to the redundant AFE channel and to the redundant AFE channel buffer to process the sine output signal when the sine output signal is selected or feed the cosine output signal to the redundant AFE channel and to the redundant AFE channel buffer when the cosine output signal is selected;

the comparator circuit to:
obtain a voltage difference as the difference between an output voltage of a sine AFE channel buffer and an output voltage of the redundant AFE channel buffer when the sine output signal is selected;

obtain the voltage difference as the difference between an output voltage of a cosine AFE channel buffer and the output voltage of the redundant AFE channel buffer when the cosine output signal is selected;

determine if the voltage difference is greater than a predetermined threshold voltage; and the processor further to signal a fault condition to an electronic control unit (ECU) coupled to the inductive position sensor if it is determined that the voltage difference is greater than the predetermined threshold voltage.

16. The system of claim 15, wherein the predetermined threshold voltage equates to a predetermined angular error threshold at the ECU.

17. The system of claim 16, wherein the predetermined angular error threshold is adjustable.

18. The system of claim 16, wherein the predetermined angular error threshold is greater than about 3°.

19. The system of claim 15, wherein the voltage difference is attributable to one or more error sources at the AFE of the inductive position sensor.

20. The system of claim 15, wherein the inductive position sensor is selected from a rotary position sensor and a linear position sensor.

21. The system of claim 15, wherein the voltage difference equates to an angular error at the ECU.

* * * * *